March 17, 1970   H. J. DEA ETAL   3,501,027
PIPE RACKING AND TRANSFER ASSEMBLY
Filed March 11, 1968   16 Sheets-Sheet 1

INVENTOR
HENRY J. DEA
PAUL E. LYNCH

*Richards, Harris & Hubbard*
ATTORNEY

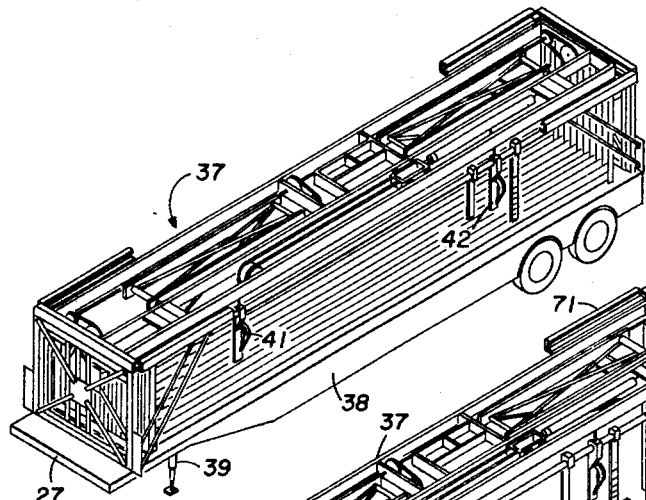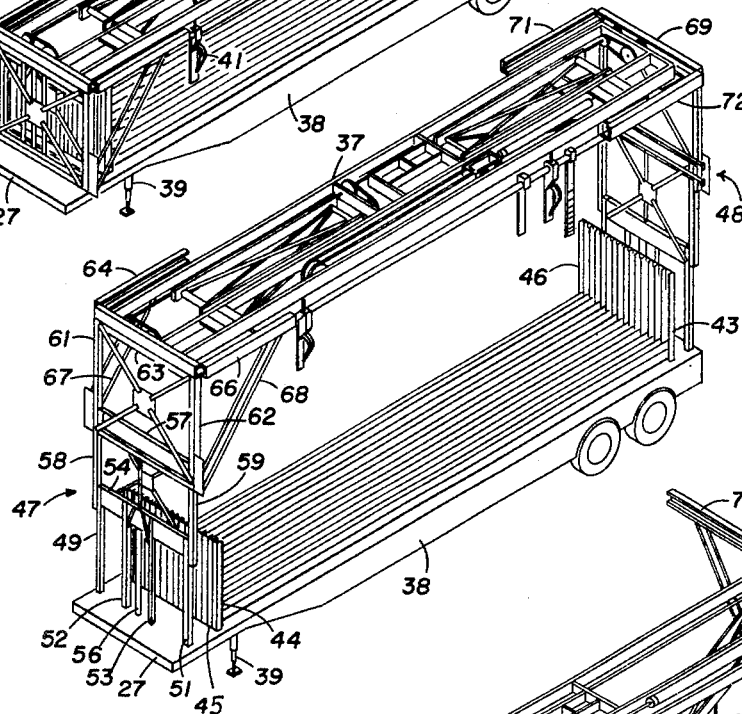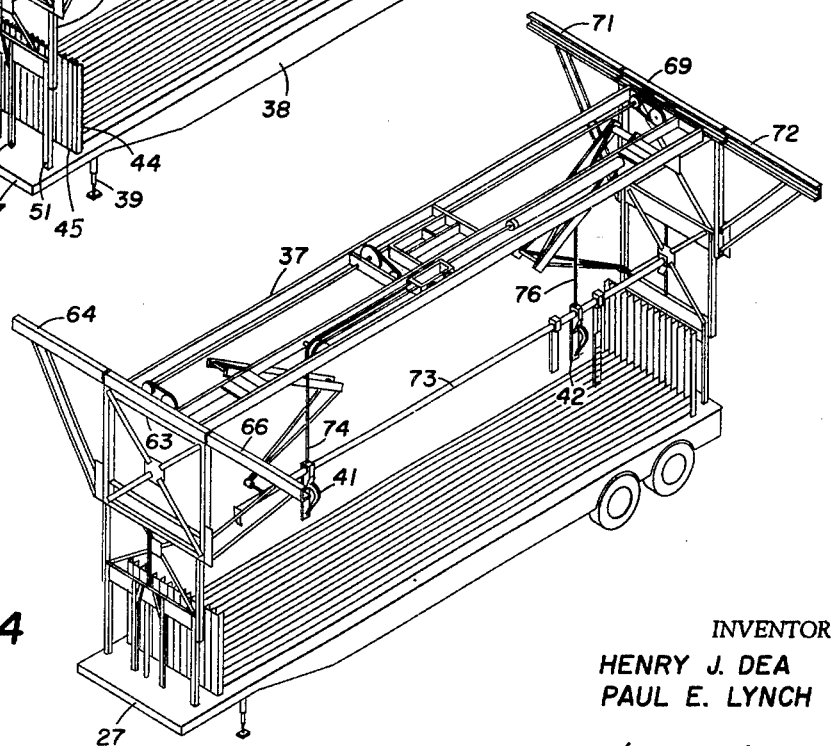

INVENTOR
HENRY J. DEA
PAUL E. LYNCH

ATTORNEY

March 17, 1970     H. J. DEA ETAL     3,501,027
PIPE RACKING AND TRANSFER ASSEMBLY
Filed March 11, 1968     16 Sheets-Sheet 4

INVENTOR
HENRY J. DEA
PAUL E. LYNCH

ATTORNEY

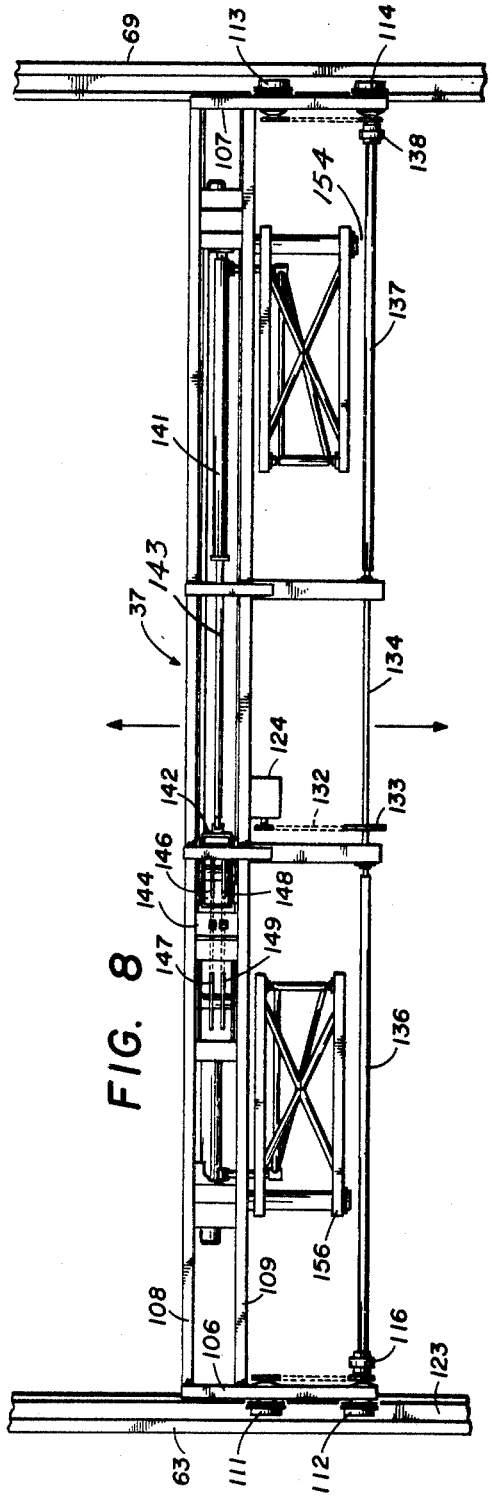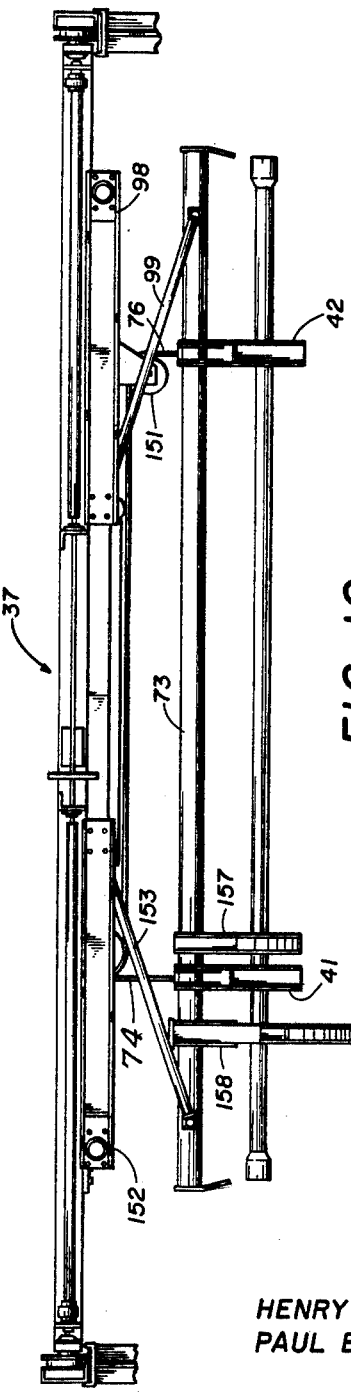

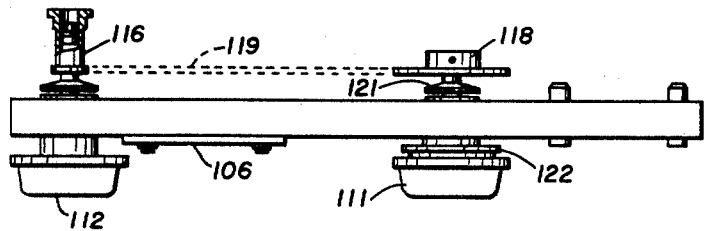
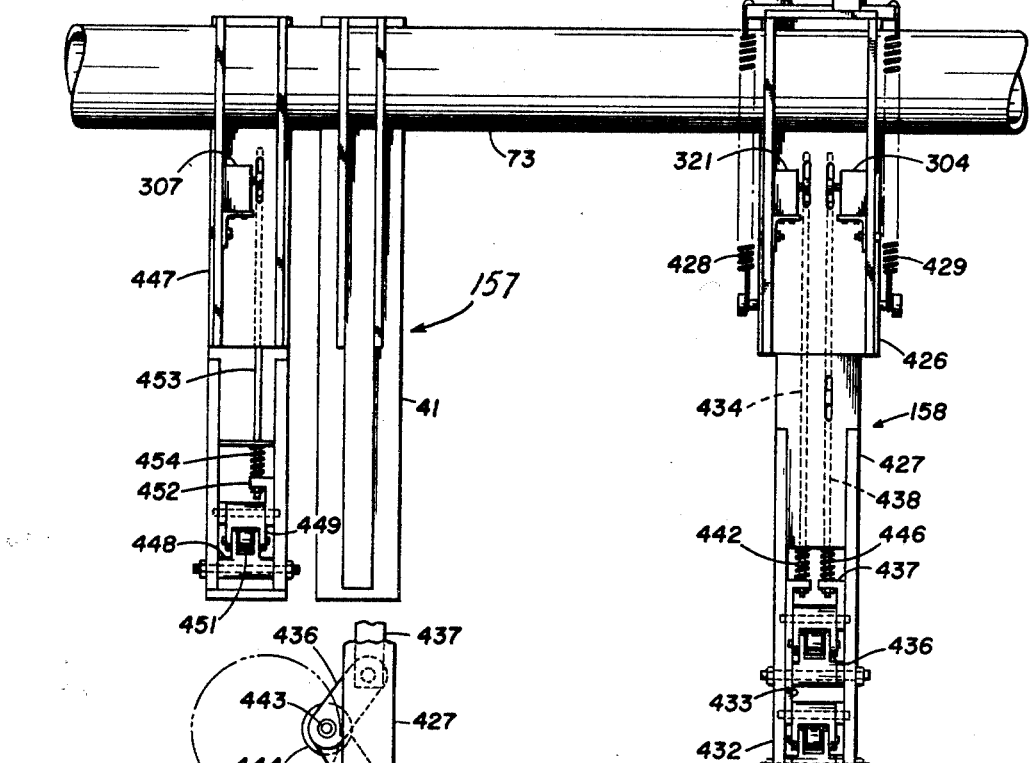
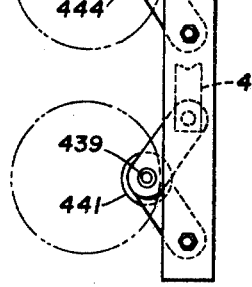
FIG. 9
FIG. 11
FIG. 12
INVENTOR
HENRY J. DEA
PAUL E. LYNCH

INVENTOR
HENRY J. DEA
PAUL E. LYNCH

ATTORNEY

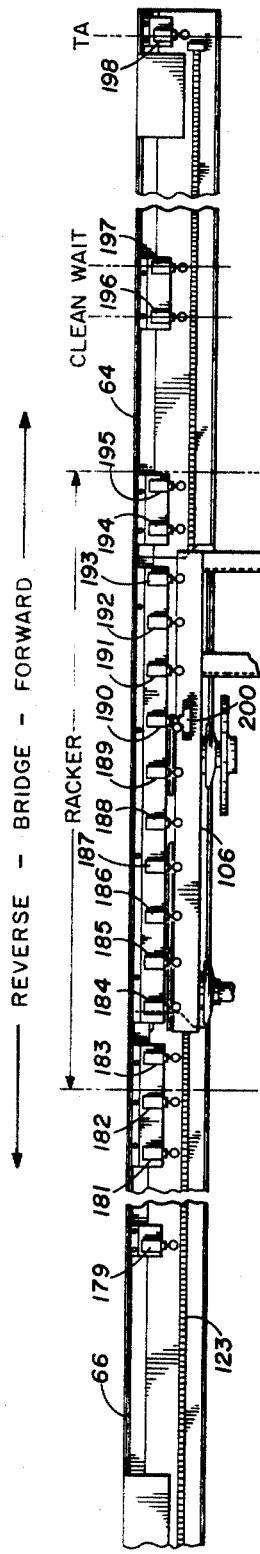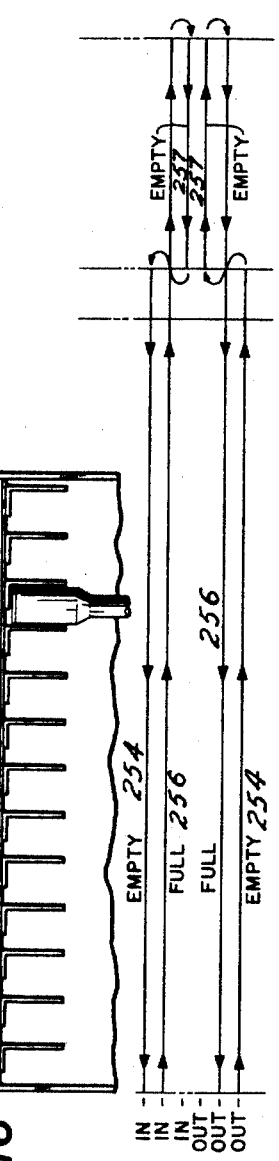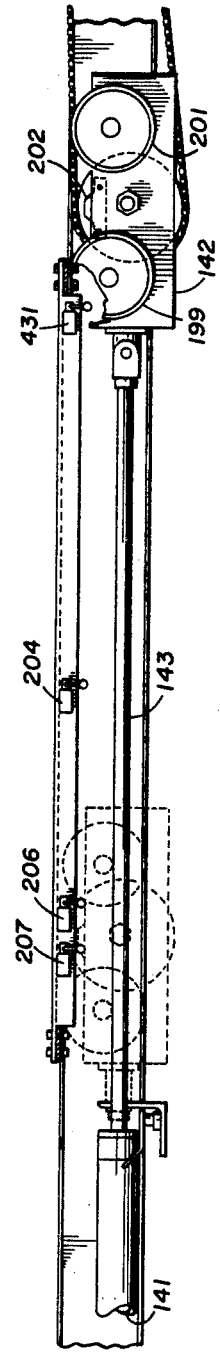

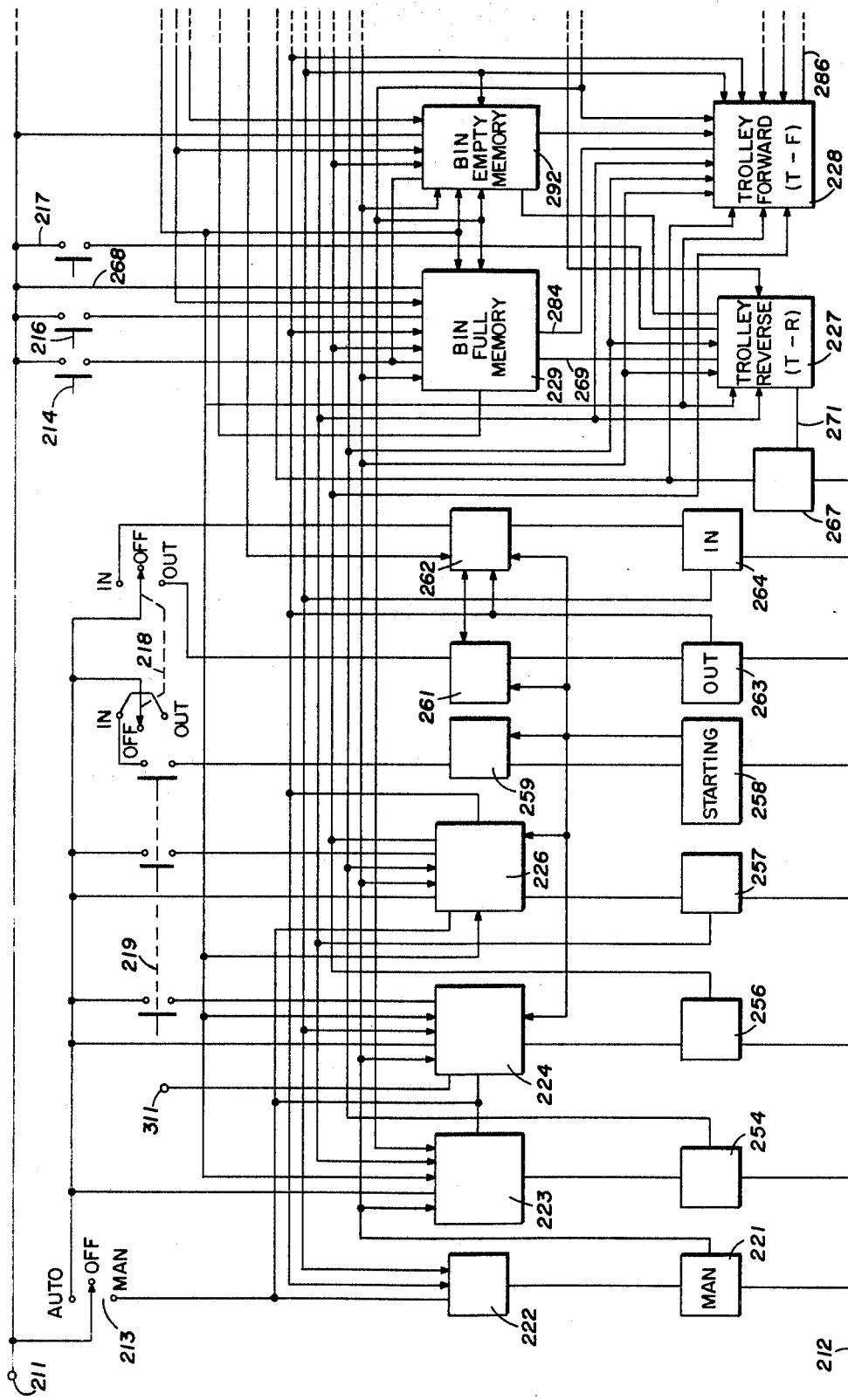

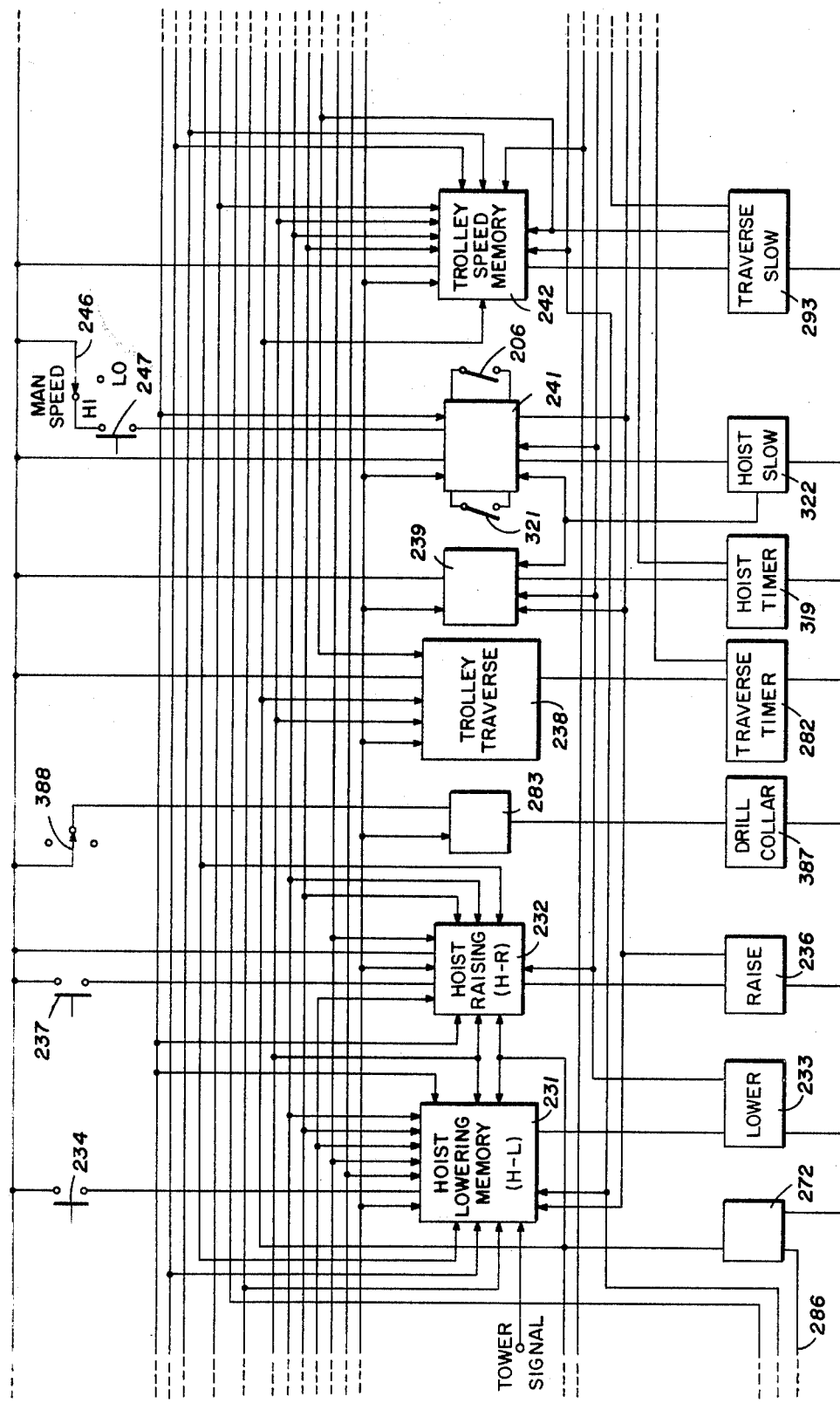

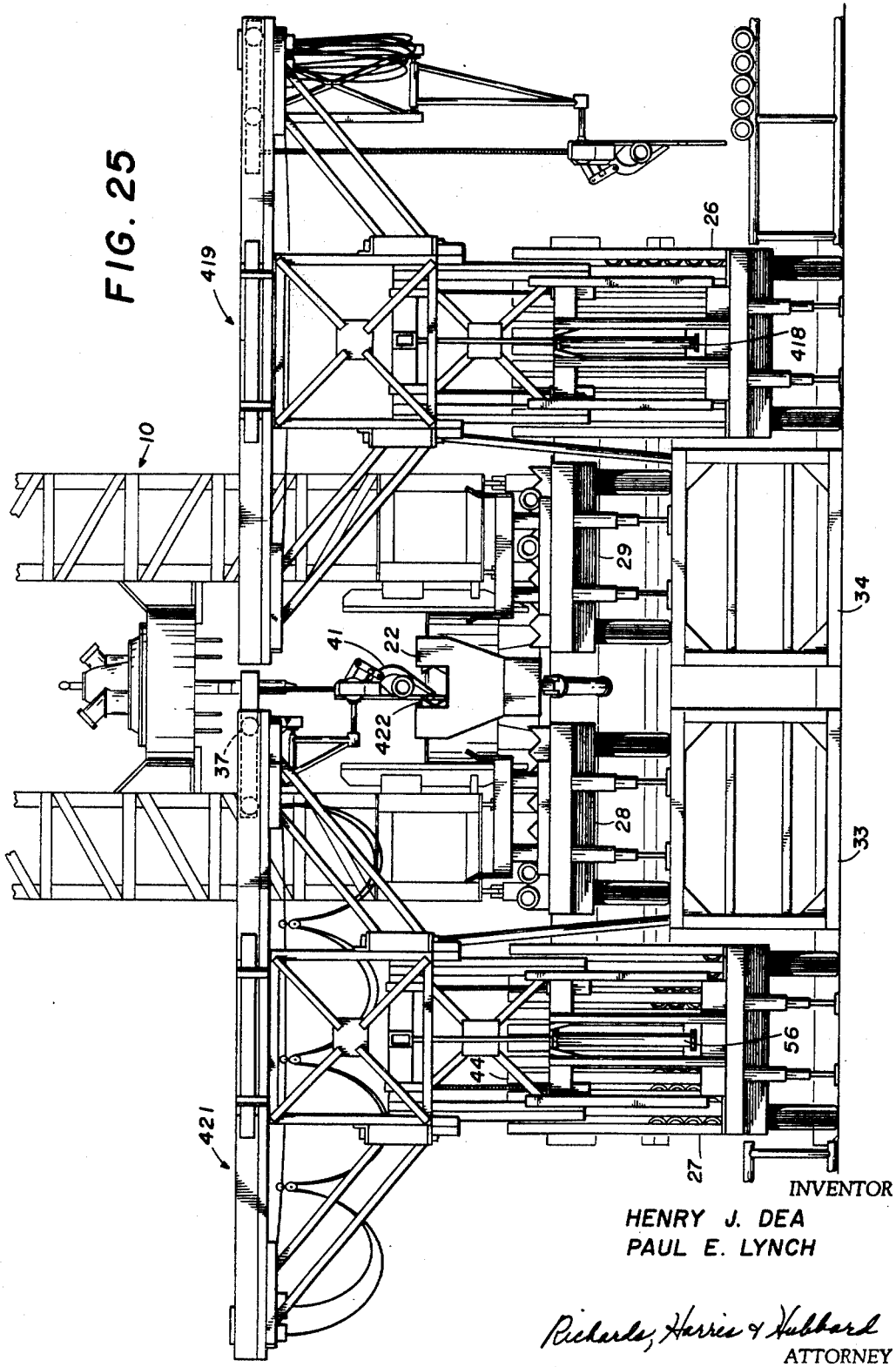

3,501,027
PIPE RACKING AND TRANSFER ASSEMBLY
Henry J. Dea, Oakland, Calif., and Paul E. Lynch, Richardson, Tex., assignors, by mesne assignments, to Kendrick Cattle Company, Sheridan, Wyo., a corporation of Wyoming
Filed Mar. 11, 1968, Ser. No. 712,061
Int. Cl. B65g 1/00; B60p 1/46; E21b 19/00
U.S. Cl. 214—16                                    19 Claims

ABSTRACT OF THE DISCLOSURE

A self-contained portable pipe racking and transfer apparatus including a pipe handling crane operable in a collapsible rail mounted to a frame telescoping from a lower position to an upper position when operating in conjunction with a portable drilling rig. The telescoping operation of the crane rail permits storage of extra sections of drill pipe in a plurality of pipe storage bins during transportation of the entire assembly. A control system automatically sequences the pipe crane operation to transport sections of drill pipe from the storage bins to the drilling rig and return pipe from the rig to the racks. Limit switches advance the automatic control system from one sequence to the next for both the "in" and "out" functions of the pipe crane such that the entire operation is completely controlled without human intervention.

RELATED APPLICATIONS

United States patent application Ser. No. 712,164, also entitled "Pipe Racking and Transfer Assembly" and filed on Mar. 11, 1968.

BACKGROUND OF THE INVENTION

This invention relates to a pipe racking and transfer apparatus, and more particularly to a portable pipe racking and transfer apparatus including a telescoping crane assembly and a completely automated control.

Recently, it has become apparent that because of the relatively high cost of conventional well drilling, a new, more versatile system must be developed. As a result, there has been considerable activity in the past few years to develop a portable drilling rig that is easily transported between drilling sites using conventional tractor-trailers. Most of the well drilling rigs that have been developed to date are restricted in their use to relatively shallow wells. Some of these rigs are so heavy and cumbersome that they require special permits to be moved over the highways of the various states between the initial location of the drilling rig and the well hole site. As a result, it is oftentimes very difficult and costly to move such drilling rigs between locations.

In any well drilling operation, be it by conventional rig or a portable rig, one of the most difficult problems confronting the well driller or others desiring to bore into or through the crust of the earth is the handling and storage of drill pipe during the drilling operation. For instance, assume the situation where an oil well is to be drilled several thousand feet deep into the surface crust of the earth and the drill bit is at about the two thousand foot level; it strikes a hard formation and is dulled. This necessitates removal of all two thousand feet of drill pipe to expose and replace the dulled bit. The two thousand feet of pipe, usually in about thirty-foot sections, must be stored quickly and in such a manner that it can be easily retrieved when a replacement bit is to be again lowered into the hole for resumption of the drilling operation.

Quick and reliable storage and retrieval of the drill pipe is thus an important aspect of any drilling operation and especially a portable rig wherein the saving of time is an important factor. Over the years a number of attempts have been made to develop pipe storage stations for portable rigs including some for submersible drilling rigs. Since the saving of time is such an important consideration in portable well drilling operations, an immediately available supply of drill pipe is a necessity as soon as the entire rig is operational. Many available pipe storage stations are constructed in a manner that requires the drill pipe to be carried on separate hauling vehicles. This was primarily the result of unavailable storage space when the unit was collapsed for transportation. Pipe storage stations of this type require additional set up time since the drill pipe must be unloaded from the hauling vehicles before it is ready to be transferred to the derrick. As a result, a considerable amount of valuable time is lost because the drill pipe was not readily available.

Another important consideration in any drilling rig operation is the number of dangerous conditions to which the drilling crew is exposed. Such danger to the well drilling crew is, of course, reflected in high insurance costs to the owner of the drilling rig which must be taken into account when determining the advantages of one system over another. When it is understood that a section of drill stem weighs as much as twenty-five hundred to three thousand lbs., it will be understood that a considerable amount of danger is inherent in the handling of such unwieldy objects. It thus becomes important to reduce to a minimum the amount of handling of the drill pipe by the crew. This is best accomplished by a completely automatic system and particularly to a completely automatic pipe storage and transfer system.

In accordance with the present invention, there is provided a pipe storage and transfer system wherein a limited number of drill pipe sections can be stored when the system is in a collapsed condition; these sections are immediately available at a new site. In addition, the entire "in" and "out" pipe transferring operation is performed completely automatic without human intervention. The pipe storage and transfer mechanism of this invention is rugged enough to withstand the rigors of a drilling operation with a minimum of down-time for repairs. Further, the pipe storage station of this invention is easily collapsed into a package that is transportable over the highways of the various states without obtaining a special permit.

In accordance with a particular aspect of the invention, there is provided a portable pipe storage and transfer system wherein a traveling crane moves on a rail elevated to the proper position at the drilling location. The pipe storage station is a separate component of the overall drilling rig and is connected to the drilling tower only through necessary control functions. Operation of the system is completely automatic and sequenced by means of sensing elements located throughout the storage assembly. Drill pipe is retrieved and stored by means of a two-clamp hoist.

It is an object of the invention to provide a portable pipe racking and transfer system wherein a limited amount of drill pipe is stored during transportation of the rig from one drilling site to the next.

Another object of the invention is to provide a portable pipe racking and transfer system wherein sections of drill pipe are transported to the derrick by means of a traveling crane elevated at the drilling site.

Yet another object of the invention is to provide a portable pipe racking and transfer system wherein the "in" and "out" operation is carried automatically with a minimum amount of human intervention.

SUMMARY OF THE INVENTION

A fully automated portable pipe racking and transfer system including a plurality of upstanding parallel pipe storage bins and a pipe transfer trolley crane movable transversely of said storage bins, said transfer crane having a vertically movable pipe hoist means carried by and movable with the crane for inserting pipe into and removing pipe from said storage bins. A vertically extendable and retractable rail assembly supports said trolley above said storage bins.

A more complete understanding of the invention and its advantages will be apparent from the specification and claims and from the accompanying drawings illustrative of the invention.

BRIEF DESCRIPTION OF THE DRAWINGS

FIGURE 2 is an isometric view of a portable pipe storage and transfer system in its fully collapsed position or hauling from one well site to another;

FIGURE 3 is an isometric view of a portable pipe racking and transfer system showing the trolley crane in its fully elevated position;

FIGURE 4 is an isometric view of a pipe racking and transfer system shown fully assembled and ready for use at a drilling site;

FIGURE 8 is a top view of the trolley crane;

FIGURE 9 is an enlarged view of the front truck of the trolley crane of FIGURE 8;

FIGURE 10 is a side view of a two-clamp hoist;

FIGURE 11 is an enlarged view of a bin locator and pipe sensor of the hoist of FIGURE 10;

FIGURE 12 is a detail of the limit switch actuators of the bin locator and pipe sensor;

FIGURE 16 is a top view, partially broken away, of one crane rail showing the location of the various limit switches for sequencing the operation of the trolley crane as it traverses the storage bins;

FIGURE 17 is a side view of the trolley crane, partially cut away, showing the location of the limit switches for controlling the operation of the hoist and pipe hook;

FIGURES 18–23 are schematic diagrams of an electrical control system for controlling the overall operation of one of the storage stations of FIGURE 1 in conjunction with the overall well drilling operation;

FIGURE 25 is a rear view of a portable rig having two pipe storage stations in accordance with the present invention; and FIGURE 26 is a bar chart showing the energizing sequence of the control system.

DESCRIPTION OF THE PREFERRED EMBODIMENT

Figure 1:
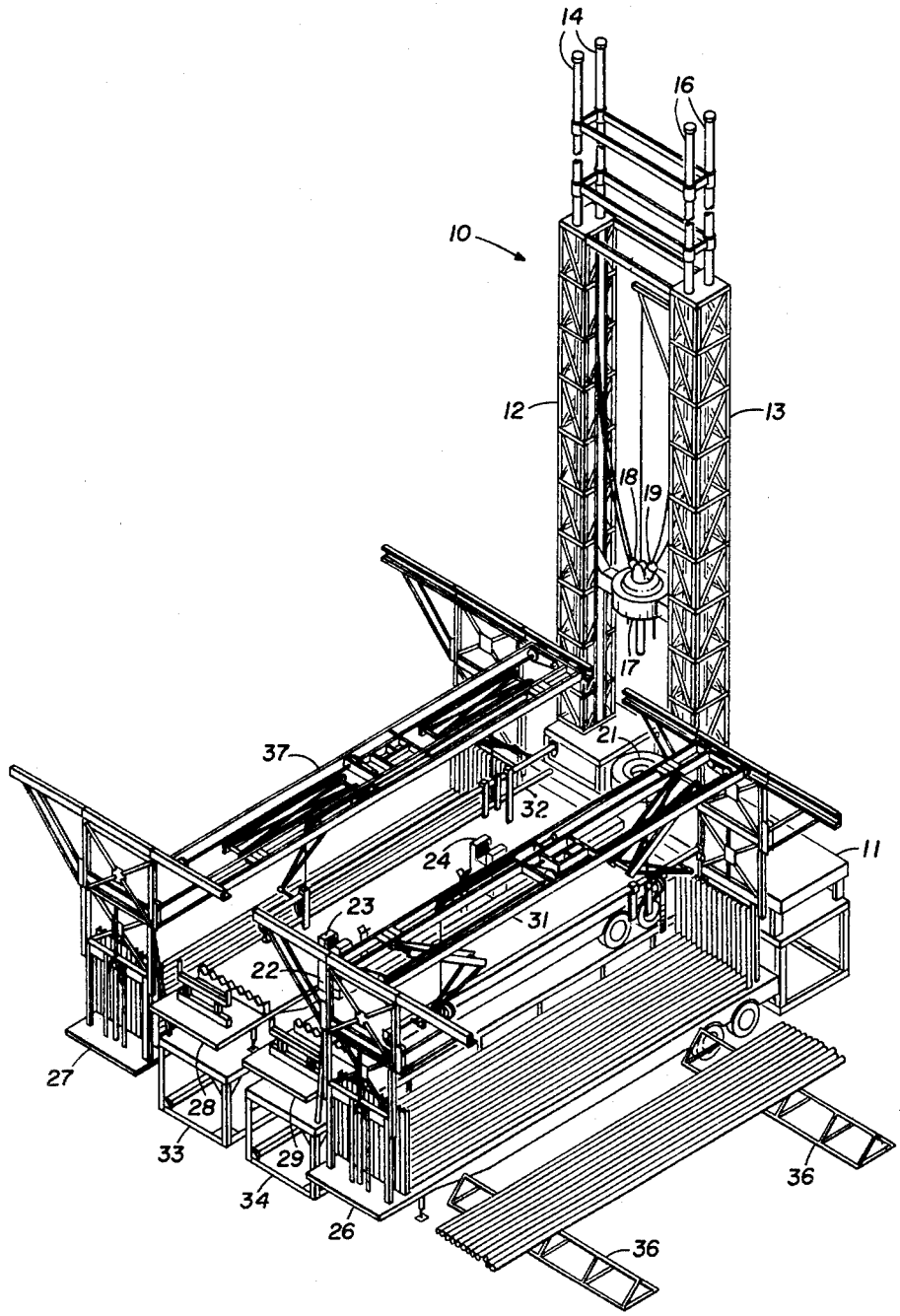
FIGURE 1 is an isometric view of an assembled portable well drilling rig including a pair of pipe rackers in accordance with this invention.

Throughout the description the same reference numerals will be used to identify a component whenever it appears in any of the twenty-six figures.

Referring to FIGURE 1, there is shown a complete drilling rig including a derrick 10 supported on a skid 1 and having two towers 12 and 13. The towers 12 and 13 are each topped with a pair of fluid cylinders 14 and 16, respectively, for positioning a drill head 17. Guide tracks (not shown) built into the towers 12 and 13 provide a means for guiding the movement of the drill head 17 as it is positioned by the fluid cylinders 14 and 16. To rotate the drill string in either a clockwise or counterclockwise direction, pressurized fluid is supplied the drill head 17 through fluid motors 18 and 19. The drill string sections are assembled in a make-up chuck 21 movable between three distinct positions. The upper terminal position is occupied to hold the drill pipe when making and breaking the top joint, the center position is occupied during the lower joint makeup and breakout operation, and the lower position permits an incoming section of drill pipe to clear the make-up chuck as it is being hoisted into position by a transfer arm 22.

The transfer arm 22 is movable by means of hydraulic cylinders (not shown) from the horizontal position, as shown, to the vertical position or "in derrick" position. When in the vertical or "in derrick" position, the transfer arm 22 establishes the axis of the incoming drill pipe coincident with the axis of the drill head spindle and the drill string. The transfer arm 22 includes an upper clamp 23 and a lower clamp 24 adapted to clamp, hold, and transfer all the drill pipe that go into or out of the hole from either the left pipe storage station 27 or the right pipe storage station 26. The transfer arm also includes pipe guides (not shown) to properly orient a section of drill pipe.

Drill pipe taken from either the storage station 26 or 27 is transferred directly to the transfer arm 22, by means of a trolley crane included at each station, to be described, or to the pipe treating stations 28 and 29. Usually a section of drill pipe is first transferred to the pipe treating station prior to being transferred to the transfer arm 22. The pipe treating stations include means for performing certain pipe preparing operations on each section of drill pipe. For example, a pipe section may be tested for tensile strength, or the threads cleaned, or lubrication applied to the threads. In FIGURE 1, a trolley crane 37 included with the storage station 27 is shown transferring a section of drill pipe 32 to the treating station 28. The pipe treating stations 28 and 29 are mounted on trailers which in turn are supported by means of skids 33 and 34.

Additional drill pipe sections are stored adjacent the storage station 26 on a pair of racks 36. These sections may be transferred directly to the transfer arm 22 by means of a trolley crane 31, as needed, or picked up by the trolley and stored in the station 26.

The basic operation of the system shown in FIGURE 1 is as follows: a drill bit is attached to the first section of drill pipe and "spudded in." Simultaneously, another section of drill pipe s transferred from either the left or right storage station by means of its trolley crane to the pipe treating station wherein cleaning and lubricating operations are performed, This prepared section of drill pipe is then transported to the transfer arm 22 which raises it from a horizontal position to a vertical position in line with the first section of drill pipe. The pipe hoisted to a vertical position by means of the transfer arm 22 is "stabbed into" the drill string by means of the transfer arm guides and "made up" by means of the drill head 17. After the making up operation is complete, the make-up chuck 21 releases the drill string and the drill head 17 commences to rotate the drill bit through the string until the box end of the last section of pipe reaches the area of the make-up chuck.

During the "drilling down" operation of one piece of pipe, another is being transferred to the transfer arm 22 to be ready when needed. When the preceding section of pipe has been "drilled down," the drill head 17 is disengaged and raised to its upper position and the next drill pipe section raised to a vertical position. The sequence of operation is continuously repeated until the desired depth is reached or until it becomes necessary to remove the entire drill string.

To remove the drill string, the reverse procedure takes place. The entire string is hoisted by the drill head 17 until a joint between two pipe sections reaches the area of the make-up chuck 21. The transfer arm 22 is raised to a vertical position and the transfer arm guides orient the top pipe section. At the same time, the make-up chuck 21 moves to its upper position and clamps the lower pipe section. The drill head 17 breaks the joint between the two pipe sections and the upper section is spun out to clear the lower section. Next, the transfer arm clamps secure the top section to the transfer arm 22. When the disconnected section of pipe is secured to the transfer arm 22, it is disengaged from the drill head 17 and the transfer arm lowered to its horizontal position. One of the trolley cranes 31 or 37 moves into position, a hoist lifts the section of pipe from the transfer arm, and transports it to the respective storage bins. As with the drilling down operation, the removal operation continues in a smooth sequence. As the transfer arm 22 begins to move from the vertical to the horizontal position, the drill head 17 is lowered to engage the next section of drill pipe to again lift the entire drill string from the hole. Again, when this next section of pipe has been disengaged from the drill string, the transfer arm 22 is raised to the vertical position, clamped to the disconnected section of pipe, and lowered to the horizontal position. This sequence continues until the entire drill string has been removed or the desired portion removed.

This invention is related primarily to the pipe storage stations (also known as pipe rackers), one of which, station 27, is shown completely folded in FIGURE 2. The pipe storage station 27 is assembled on a tandem-axled trailer 38 pulled by a tractor (not shown) when being transported from one site location to the next. When the trailer 38 is parked at a drilling site, a pair of trailer jacks 39, only one of which is shown, supports the trailer bed in a horizontal position. The trolley crane 37 is folded into a compact position with the pipe holding clamps 41 and 42 at one side of the trailer 38. This permits the storage of a limited number of drill pipe sections in the storage station while it is being transported from one site to the next. It is believed that the limiting factor determining the number of drill pipe sections that can be stored in the station while it is being transported will be the allowable weight limit on the highways of the various states. Thus, the usual limiting factor determining the amount of drill pipe stored during movement of the storage station is controlled by other factors than available space. However, even a limited number of sections stored during transportation reduces the amount of set up time required before actual drilling begins at a new site. This is in contrast to previous pipe storage systems wherein drill pipe could not be stored during transportation.

Referring to FIGURE 3, there is shown the pipe storage station 27 partially assembled. The trailer 38 is parked in the desired position and supported by the trailer jacks 39 as explained. Trailer 38 provides an elongated platform to which is mounted a front wall 43 and a rear wall 45. These walls are utilized to form storage bins for containment of a large number of drill pipe disposed in orderly positions. Each of the walls 43 and 45 is provided with a series of separators 46 and 44, respectively. In the illustrated embodiment, these separators form vertical troughs or pockets which receive the pipe and dispose them in horizontal rows extending between the two wall structures 43 and 45.

Adjacent the wall section 43 and the wall section 45 there is mounted on the trailer 38 a three-section elevator mechanism 47 and 48, respectively, for extending the trolley crane 37 to its operating position. Referring specifically to the elevator 47, it includes a bottom section having side channels 49 and 51, center channels 52 and 53, and a horizontal channel 54. An elevator cylinder 56 is positioned between the channels 52 and 53 and includes a piston rod connected to the lower crossbar 57 of a center section.

The side channels 49 and 51 of the lower section provide a guide track for the side channels 58 and 59 of the center section. Channels 58 and 59 in turn provide a guide track for the side channels 61 and 62 of an upper section. Mounted at the top of the side channels 61 and 62 is a crane rail 63.

Hinged to either side of the crane rail 63 are side rails 64 and 66. These rails are supported by diagonal braces 67 and 68, respectively. A similar assembly is provided for the elevator mechanism 48. It also includes a crane rail 69 with side rails 71 and 72 hinged thereto and in alignment therewith when in an operating condition.

Referring to FIGURE 4, there is shown the pipe storage station 27 in its fully assembled, ready to use condition. The side rails 64 and 66 have been extended to form a continuous straight rail with the section 63. Similarly, the side rails 71 and 72 have been extended to form a continuous straight rail with the section 69. The pipe hooks 41 and 42 are shown partially lowered into the storage bins. These hooks are affixed to a grab pipe 73 and supported by means of flexible chains 74 and 76. A complete description of the trolley crane 37 and its operation will be given. With the pipe station assembled as shown, the trolley crane 37 is movable to the left as far as the side rails 64 and 71 will permit and to the right as far as side rails 66 and 72 will permit. This extended movement of the trolley 37 permits loading of drill pipe from outside racks into the storage bins and at the same time movement of drill pipe in and out of the storage bins directly to the transfer arm 22, as shown in FIGURE 1.

Figures 5, 7:
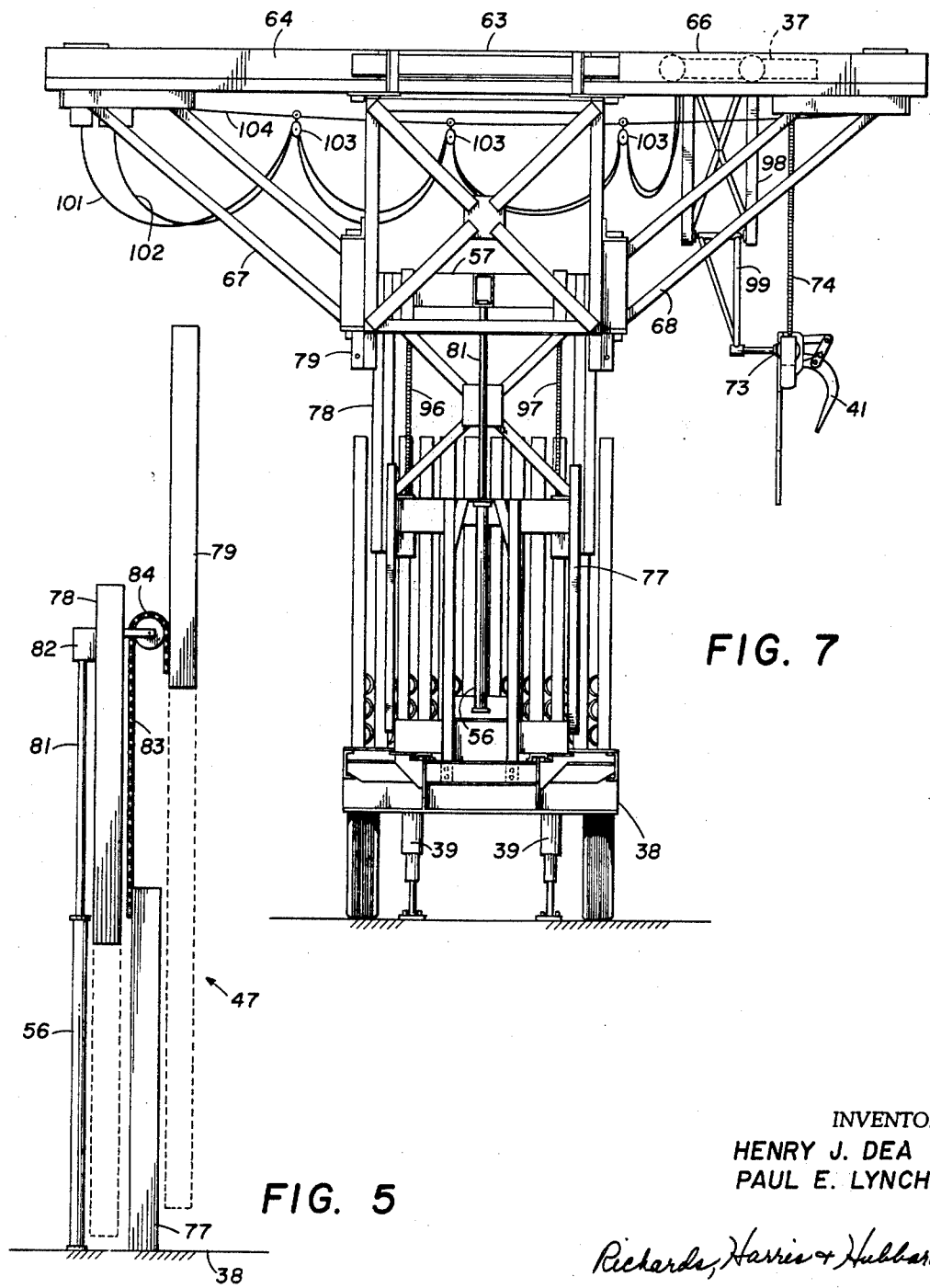
FIGURE 5 is a side view of one of the two crane elevators of the system of FIGURE 4.
FIGURE 7 is the rear view of the storage system of FIGURE 4 with the trolley crane shown at its outer limit.

Referring to FIGURE 5, there is shown schematically the elevator mechanism 47 including a lower section 77, a center section 78, and an upper section 79. The elevator cylinder 56 is shown mounted to the trailer 38 and has a piston rod 81 attached to a bracket 82. A flexible chain 83 is fastened to the lower section 77 and the upper section 79. The chain 83 engages a sprocket 84 attached to the center section 78. In operation, fluid pressure is supplied the elevator cylinder 56 causing the piston rod 81 to be extended thereby raising the center section 78 from its collapsed position (shown in dotted outline) to its extended position. Movement of the center section 78 causes the chain 83 to rotate about the sprocket 84 thus lifting the top section 79 from its collapsed position (shown in dotted outline) to its extended position. The arrangement shown in FIGURE 5 is provided at the front and rear of the trailer 38.

Figure 6:
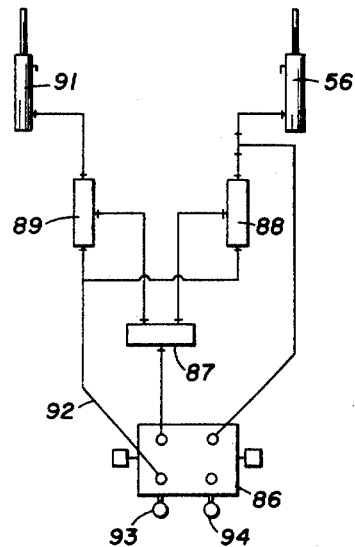
FIGURE 6 is a schematic of a hydraulic system for the trolley crane rail elevators.

Referring to FIGURE 6, there is shown a hydraulic control system for extending the front and rear crane rails from their collapsed position to their extended position. A directional control valve 86 connected to a source of fluid pressure (not shown) also connects to a flow divider 87 wherein the fluid flow from the directional control valve divides equally to a front check valve 88 and a rear check valve 89. The front check valve 88 is coupled to the elevator cylinder 56 and the rear check valve 89 coupled to an elevator cylinder 91 located at the rear of the trailer 38. Fluid from the cylinders 56 and 91 is returned to the storage tank through a line 92 connected to the check valves 88 and 89 and the directional control valve 86. It is important that the cylinders 56 and 91 are supplied fluid at a rate such that the front crane rail including sections 63, 64, and 66 and the rear crane rail including sections 69, 71, and 72 are raised in a manner to maintain the crane 37 substantially horizontal at all times. If one set of rails is allowed to be raised much faster than the other, the trolley 37 does not engage the rails at right angles and severe damage could result to the equipment. Thus, the flow divider 87 is employed to produce equal fluid flow to the cylinders 56 and 91. To raise the trolley 37 to its extended position, the handle 93 is actuated and to lower the trolley, the handle 94 is actuated. Handle 93 operates a valve to permit fluid flow to the divider 87 and the handle 94 opens a valve to return fluid from the system to the storage tank.

Referring to FIGURE 7, there is shown a front view of the portable pipe storage and transfer system 27 in accordance with this invention wherein the trailer 38 is supported in a horizontal position by means of trailer jacks 39. The crane rail consists of a center section 63 aligned with end sections 64 and 66, all of which are attached to the top section 79 of a three frame elevator system. Angle supports 67 and 68 support the end rail sections 64 and 66, respectively, and extend from the top section 79 to the outermost point of the side rails. The top section 79 is supported in its extended position by the center section 78 and a pair of flexible chains 96 and 97 which are attached to the upper section 79 and to the lower section 77 fastened to the trailer 38. The center section 78 is raised into its extended position by means of the hydraulic elevator cylinder 56 having a piston rod 81 connected to a cross member 57.

The trolley crane 37 (shown dotted) provides a movable support for a hoist having an upper stabilizing arm 98 pivotally connected to a lower stabilizing arm 99 which is coupled to the grab pipe 73 supporting the pipe hook 41. A pair of flexible chains, only one of which, chain 74, is shown in FIGURE 7, provides a means for lowering and raising the pipe hook 41. Electrical power is supplied to the crane 37 by means of a power line 101 and control signals by means of a control cable 102. The power line 101 and the control cable 102 are supported by a plurality of rings 103 sliding on a wire rope 104 fastened to the side rails 64 and 66.

As the crane 37 travels on the crane rail assembly, it traverses a plurality of storage bins wherein is stored a large quantity of drill pipe. Referring to FIGURE 8, there is shown in detail the construction of the crane 37 having a front truck 106, a rear truck 107, and parallel crane girders 108 and 109 joining the two trucks. The front truck 106 includes trolley wheels 111 and 112 riding on the rail section 63. Similarly, the rear truck 107 includes trolley wheels 113 and 114 riding in the rail section 69.

Referring to FIGURE 9, there is shown an enlarged view of the front truck 106 including the trolley wheels 111 and 112; trolley wheel 112 is free wheeling, that is, it is not driven. A reduction sprocket 116 is rotatably mounted to the shaft of the trolley wheel 112 and linked to a driving sprocket 118 by means of a flexible chain 119. The sprocket 118 is pinned to the shaft 121 of the trolley wheel 111 and serves to drive the wheel on the rail 63. Positive movement of the trolley crane 37 is provided for by means of a sprocket 122 formed as part of the trolley wheel 111. The sprocket 122 engages a chain 123 welded to the rail 63, 64 and 66 as shown in FIGURE 8. In effect, the trolley wheels 111 and 112 merely support the trolley 37 while the sprocket 122, and a similar sprocket formed as part of the trolley wheel 113 of the rear truck 107, actually propels the trolley along the crane rail assembly. The rear truck 107 is substantially the same as the front truck 106.

Figure 13:
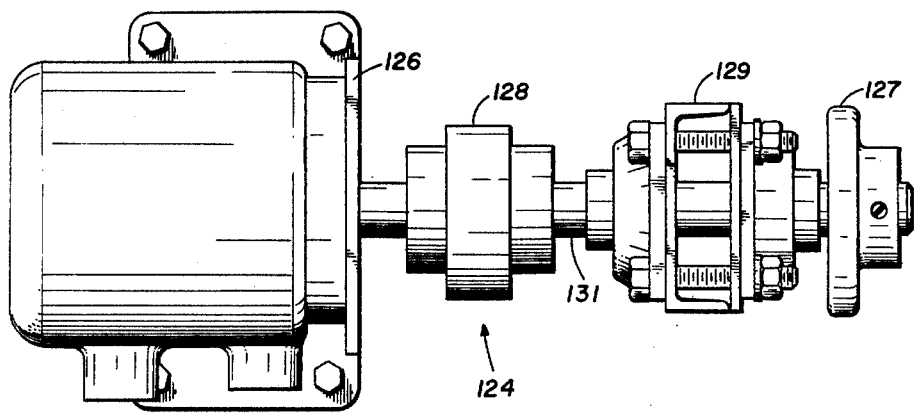
FIGURE 13 is a detailed view of the power drive for the trolley crane of FIGURE 8.

A drive unit 124 shown in detail in FIGURE 13 powers the trolley wheels 111 and 113. A hydraulic motor 126 is coupled to a sprocket 127 through a flexible coupling 128. A floating bearing 129 supports the sprocket shaft 131.

Referring again to FIGURE 8, a flexible chain 132 engages the sprocket 127, of the drive unit 124, and a drive sprocket 133 attached to a drive shaft 134. A drive tube 136 is coupled to the left end of the drive shaft 134 and also to the reduction sprocket 116 of the front truck 106. Similarly, a drive tube 137 is coupled to the right end of the shaft 134 and to a reduction sprocket 138 of the rear truck 107. In operation, oil is pumped to the hydraulic motor 126 thereby rotating the sprocket 127 which in turn rotates the drive shaft 134 and the drive tubes 136 and 137. Power from the drive tube 136 is transmitted to the trolley wheel 111 through the flexible chain 119 and power from the drive tube 137 is transmitted to the trolley wheel 113 through a flexible chain 139 in a manner similar to that described with respect to FIGURE 9. Depending on the direction of flow of fluid to the motor 126, the trolley crane 37 will move either in the forward direction or the reverse direction.

The vertical position of the pipe hooks 41 and 42 is controlled by a hoist cylinder 141 coupled to a hoist truck 142 by means of a piston rod 143. Flexible chains 74 and 76 are fastened to an anchor plate 144 attached to the crane girders 108 and 109; the chain 74 engages a sprocket 146 in the hoist truck 142 and a sprocket 147 rotating between the frame girders 108 and 109. The chain 76 engages a sprocket 148 in the hoist truck 142, a sprocket 149, a sprocket 151, and connects to the pipe hook 42.

Referring to FIGURE 10, the pipe hoist itself consists of a front and rear folding stabilizer; the rear stabilizer includes the stabilizer arms 98 and 99 and the front stabilizer includes an upper stabilizing arm 152 and a lower stabilizing arm 153. The front stabilizer is pivotally connected to the girders 108 and 109 at a pivot point 156 and the rear stabilizer pivotally connected to the girders at a pivot point 154. Pivotal connections are also provided at the grab pipe 73 to the lower stabilizing arms 99 and 153.

Referring to FIGURE 11, also attached to the grab pipe 73 is a bin locator 157 and a pipe sensor 158. The pipe sensor 158 includes a frame 426 welded to the grab pipe 73. A sliding beam 427 is mounted within the frame 426 and movable between a first position as shown and a second position shown dotted. A pair of tension springs 428 and 429 engage the top of the beam 427 and the frame 426 to bias the frame toward the first position. The beam 427 moves from its first position to its second position when the hoist exceeds the lower limit of travel into the storage bins. Movement of the beam 427 actuates a limit switch 203. Bolted to the lower end of the beam 427 is a two-bar articulated linkage 432 coupled to a limit switch 321 by means of a bracket 433 and a pushrod 434. A second two-bar articulated linkage 436 is also bolted to the beam 427 above the linkage 432 and coupled to a limit switch 304 by means of a bracket 437 and a pushrod 438.

Referring to FIGURE 12, there is shown an enlarged view of the linkages 432 and 436. The linkage 432 includes a lower bar bolted to the beam 427 and an upper bar pivotally connected to the bracket 433. The upper and lower bars are joined by a pivot shaft 439 on which is mounted a roller 441. The linkage 432 is biased into the position shown by means of a spring 442. Similarly, the linkage 436 includes a lower bar bolted to the beam 427 and an upper bar pivotally connected to the bracket 437; the two bars are joined by a pivot shaft 443. Mounted on the pivot shaft 443 is a roller 444. The linkage 436 is biased in the position shown by means of a spring 446.

As the hoist is lowered either into the storage bins or to the transfer arm 22, a section of drill pipe first engages the linkage 432 thereby causing it to assume a straightened position and actuating the limit switch 321. Continued lowering of the hoist will cause the drill pipe to engage the linkage 436 to actuate the limit switch 304. The operating function of the limit switches 304 and 321 will be described shortly.

The bin locator 157 includes a frame 447 welded to the grab pipe 73 immediately adjacent the pipe clamp 41. Also included in the bin locator 157 is a two-bar articulated linkage 448 bolted to the frame 447. The linkage 448 is similar to the linkages 432 and 436 and includes a pivot shaft 449 at the pivotal connection of the two bars. Mounted to the shaft 449 is a roller 451. Operationally, linkage 448 is likewise similar to the operation of either linkage 432 or 436. It is coupled to a limit switch 307 by means of a bracket 452 and a pushrod 453. A bias spring 454 maintains the linkage 448 into a configuration such as shown in FIGURE 12. The linkage 448 is actuated by a section of drill pipe when it is in the pipe clamp 41. Again, the operating function of the limit switch 307 will be described shortly.

Figure 14:
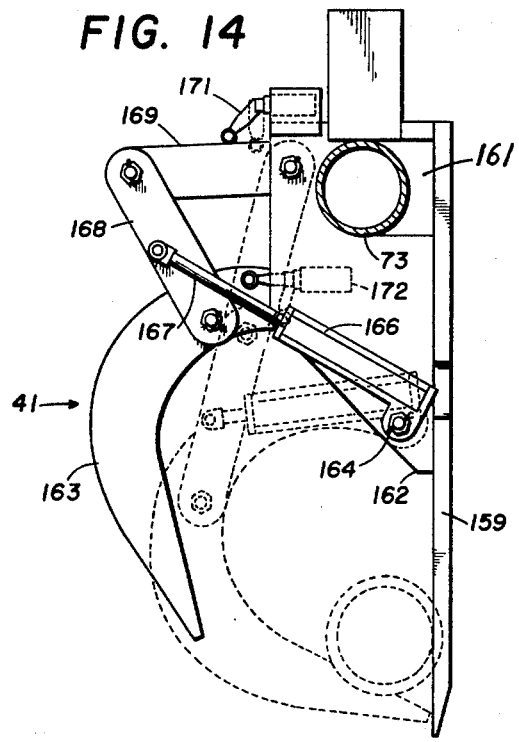
FIGURE 14 is a detailed side view of a pipe hook shown in its open position.

Referring to FIGURE 14, there is shown in detail the pipe hook 41 having side plates 161 and 162 welded to a safety plate 159 and to the grab pipe 73. A hook 163 rotates about a pivot 164 by means of a hydraulic cylinder 166 having a piston rod 167 connected to an articulated linkage consisting of segments 168 and 169.

The hydraulic cylinder 166 is a double acting cylinder, application of pressure in one direction causes the piston rod 167 to be extended and the hook 163 rotated to the position shown. Application of pressure in the opposite direction causes the piston rod 167 to be retracted into the cylinder 166 thereby rotating the hook 163 to the pipe holding position, as shown in dotted outline.

A limit switch 171 actuated by the segment 169 generates an electrical signal when the hook 163 is in the open position and a limit switch 172 senses when the hook is in the pipe holding position. These limit switches will be discussed later in connection with the overall control system of the portable pipe storage and transfer apparatus of this invention.

Figure 15:
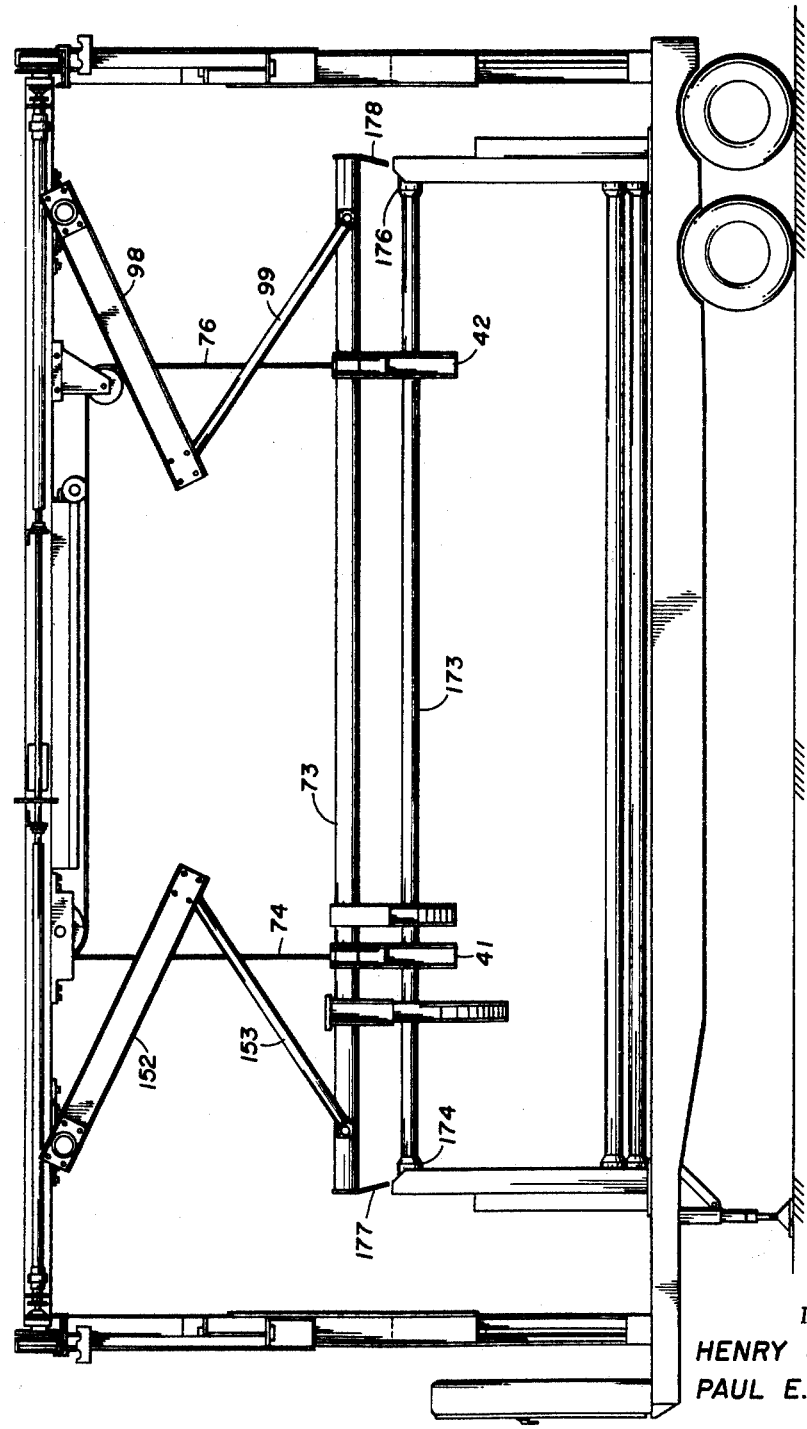
FIGURE 15 is a side view of the pipe storage and transfer system of FIGURE 4 shown in its operating position moving a section of drill pipe.
Figure 20:
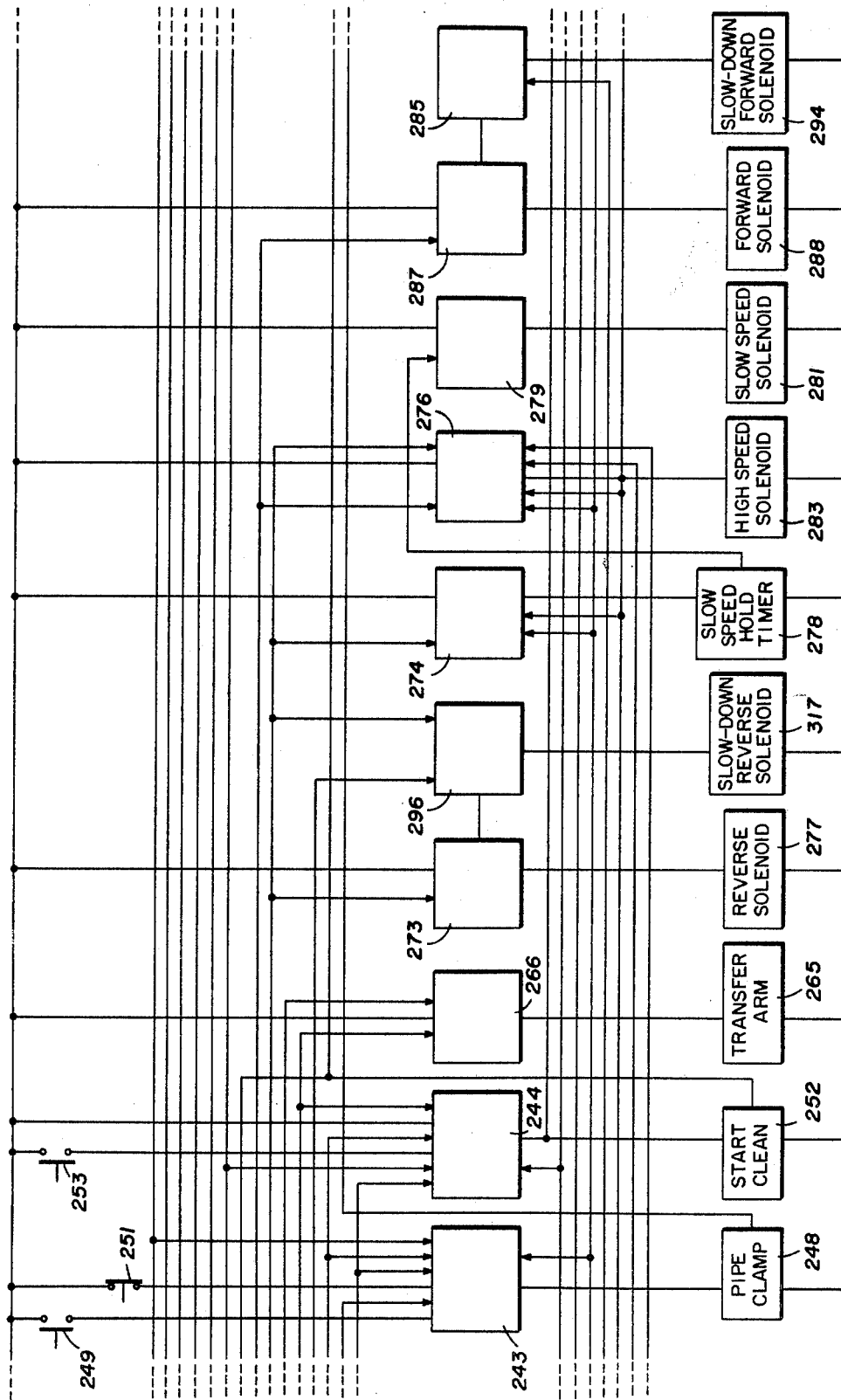

Referring to FIGURE 15, there is shown the pipe hoist midway between its upper position and its fully extended position moving a section of drill pipe 173. The storage bin is designed to accommodate the box and pin ends 174 and 176 of the drill pipe 173. A pair of guides 177 and 178 attached to opposite ends of the grab pipe 73 guides the pipe hoist as it descends into the storage bins. As the hoist moves from its collapsed position to retrieve or deposit a section of drill pipe in a storage bin, the upper stabilizing arms 152 and 98 form a type of "scissors jack" configuration with the lower stabilizing arms 153 and 99. These arms do not contribute to the actual lifting operation, but rather provide a stable reference for the pipe hooks 41 and 42. The actual lifting of the pipe hooks 41 and 42 is accomplished through the flexible chains 74 and 76.

Referring to FIGURE 16, there is shown a top view of the front crane rail, including sections 63, 64, and 66. Mounted to the top of the rail is an array of nineteen limit switches actuated by a cam 200 bolted to the front truck 106. The limit switch 179 controls the movement of the crane 37 as it approaches a rack loading position for retrieval of pipe from the racks 36 of FIGURE 1. Limit switches 181–195 control the position and speed of travel of the trolley crane 37 as it approaches a self-selected storage bin. The limit switches 196 and 197 are actuated by the trolley crane 37 in the area of the pipe treating station 28 and the limit switch 198 senses the position of the trolley as it approaches the transfer arm 22.

Referring to FIGURE 17, there is shown a side view of the trolley crane 37, partially cut away, including the hoist cylinder 141 and the piston rod 143 coupled to the hoist truck 142. The hoist truck 142 rides in channels formed by the trolley girders 108 and 109 on four trolley wheels, two of which are shown, 199 and 201. With the hoist truck in the position shown, the hoist is fully extended into a storage bin. When the hoist truck 142 is in the dotted outline position, the hoist is fully retracted. The position of the truck 142 is primarily controlled by the sensor assembly shown in FIGURE 11 with backup control provided by means of four limit switches actuated by means of a cam 202. The limit switch 431 responds when the hoist is fully extended; a limit switch 204 responds when the hoist is in a bay full position, that is, when the pipe hooks 41 and 42 are aligned to engage a section of drill pipe at the top position of a particular storage bin; and as the hoist nears its fully retracted position a limit switch 206 is actuated to slow down the hoist raising operation. The limit switch 207 is actuated when the hoist has reached its fully retracted position to stop the hoist movement. The limit switches 431, 204, 206, and 207 are mounted on an angle iron brace bolted to the trolley girders 108 and 109.

Referring to FIGURES 18–23, there is shown a control system for a portable pipe storage and transfer apparatus 27 of FIGURE 1. A similar control system is also provided for the pipe storage and transfer apparatus 26. The various control functions are put into operation by means of the various limit switches described in FIGURES 11, 14, 16, and 17. Additional control signals are supplied from various stations throughout the drilling rig, such as the transfer arm 22. The control system of FIGURES 18–23 is supplied electrical energy from a 110 volt alternating current supply (not shown) connected to a pair of terminals 211 and 212.

Before proceeding with the description of the control system, a brief description of the various "black box" components will be given. A "black box" type diagram was used to simplify the description since the particular type of control component employed is a matter of preference. For example, many of the "black boxes" to be described, identified as "controllers" throughout the description, could be simply arrangements of contacts to be opened and closed by a relay coil. Again, for the sake of simplicity, the energizing circuits, typically a relay coil, are shown separate and detached from their associated controllers. It should be understood that solid-state switching circuits could also be used in place of contactor type mechanical relays.

Automatic or manual operation of the pipe storage apparatus 27 is selected by means of a single-pole three-position switch 213. When the pipe storage apparatus 27 is operated manually, the push button switches 214, 216, 217, 234, 237, 247, 249, 251, and 253 control the various movements of the trolley crane 37, the hoist, and the pipe hooks 41 and 42. With the exception of the switch 249, these switches are momentary contact type and must be held closed until the function is satisfied.

For automatic operation, a two-pole three-position switch 218 is set in either the "in" or "out" position depending on whether pipe sections are being taken from the transfer arm 22 to the storage bins or whether the sections are being taken from the storage bins to the transfer arm. Automatic operation cannot be started unless the trolley has been located manually outside the bin areas (between the limit switches 195 and 198) and the crane has been raised to its top of travel position (limit switch 207 closed). After the above conditions have been met, automatic operation can be started by setting the switch 213 in the automatic position and pushing the auto start button 219. Automatic operation commences by closing the push button switch 219 which energizes a preliminary control circuit 256 through the preliminary controller 224, a preliminary starting circuit 257 through the preliminary controller 226, and a starting circuit 258 through a starting controller 259. Energizing the preliminary starting circuit 256 generates a signal to the preliminary controller 226, the trolley reverse (T–R) controller 227, the bin full memory 229, the hoist lowering (H–L) memory 231, the hoist raising (H–R) controller 232, the pipe clamp controller 243, and the pipe cleaning controller 244. When energized, the preliminary starting circuit 257 generates a signal to the preliminary controller 223, the trolley reverse and trolley forward controllers 227 and 228, the (H–L) memory 231, and the hoist raising (H–R) controller 232. Energizing the starting circuit 258 causes a signal to be transmitted to the preliminary controllers 224 and 226, the starting controller 259, an operation controller 261, and an operation controller 262. The operation controller 261 provides a means for energizing an operation circuit 263 when the switch 218 is in its "out" position. Similarly, the operation controller 262 provides a means for energizing an operation circuit 264 when the switch 218 is set in its "in" position. If the operation circuit 263 is energized, a signal is generated to the operation controller 262, the preliminary controller 226, the controller 222, the bin full memory 229, the trolley forward (T–F) controller 228, the (H–L) memory 231, the (H–R) controller 232, the trolley speed (T–S) memory 242, and a transfer arm controller 266. Energizing the operation circuit 264 generates a signal to the operational controllers 261 and 262, the manual controller 222, the preliminary controller 224, the (T–F) controller 228, the (H–L) memory 231, the (H–R) controller 232, the (T–S) memory 242, the cleaning controller 244, and the transfer arm controller 266.

If the three-position switch 218 is in the "in" position, the system is now ready to automatically transfer drill pipe from the storage bins to the transfer arm 22, assuming the trolley is not in the bin area and the hoist is empty at its upper limit of travel. A trolley reverse (T–R) circuit 267 is energized through the trolley controller 227 and the bin full memory 229 by means of connecting lines 268, 269, and 271. Energizing the T–R circuit 267 results in a signal being transmitted to the T–F controller 228 thereby preventing energization of a trolley forward (T–F) circuit 272. The T–R circuit 267 also generates a signal connected to the H–L memory 231, the H–R controller 232, the traversing timer controller 238, the T–S memory 242, a reverse solenoid controller 273, a slow speed hold controller 274, and a high speed solenoid controller 276.

A signal to the reverse solenoid controller 273 completes a circuit that connects a reverse solenoid 277 to the 110 volt A.C. source. A signal from the reverse circuit 267 to the slow speed hold controller 274 causes a circuit to be completed which energizes a slow speed hold timer 278. By energizing the slow speed hold timer 278, a signal is generated to a slow speed solenoid controller 279 which in turn completes a circuit to energize a slow speed solenoid 281. The signal from the reverse circuit 267 to the traversing timer controller 238 completes a circuit to energize a traverse timer 282. After a preset period of time, the traverse timer 282 generates a signal to the high speed solenoid controller 276 and a connection is completed which results in a high speed solenoid 283 being energized.

The trolley reverse circuit 267 remains energized until the trolley crane 37 reaches a preselected storage bin. After a section of drill pipe has been hoisted from the storage bin and is ready to be transferred to the transfer arm 22, the T–F circuit 272 is energized through the bin full memory 229 and the T–F controller 228 by means of connecting lines 268, 284, and 286. Energizing the T–F circuit 272 causes a signal to be generated which is transmitted to the T–R controller 227 to lock out the T–R circuit 267. The signal transmitted from the T–F circuit 272 is also connected to the H–L memory 231, the H–R controller 232, the traversing timer controller 238, the T–S memory 242, the high speed solenoid controller 276, and a forward solenoid controller 287. A signal to the forward solenoid controller 287 from the T–F circuit 272 completes a circuit to energize a forward solenoid 288. The signal from the T–F circuit 272 to the traversing timer controller 238 and the high speed solenoid controller 276 completes the same operation as was described previously with respect to the trolley reverse operation.

Figure 23:
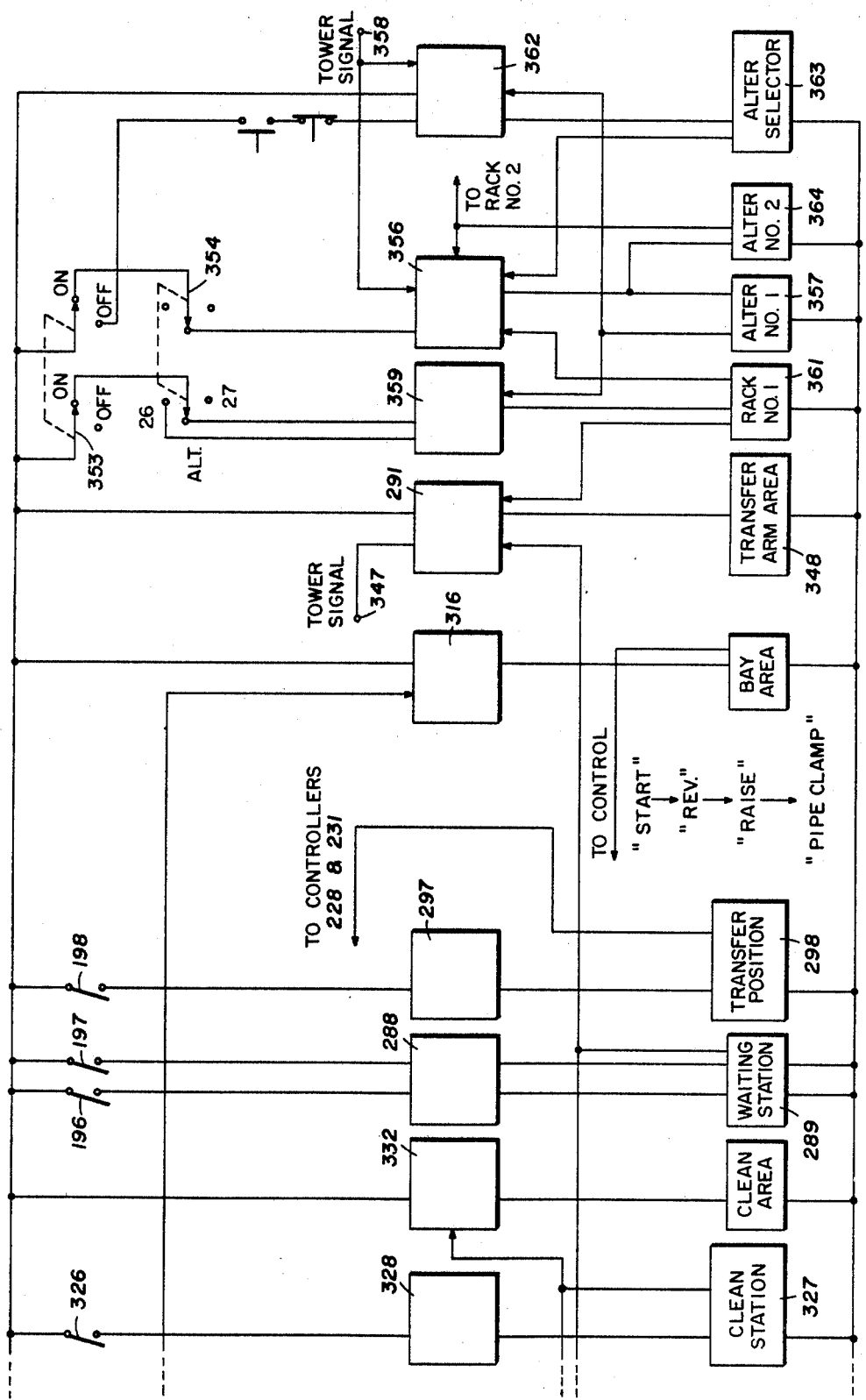

When the trolley crane 37 actuates the limit switch 196, shown in FIGURE 16 and in FIGURE 23, a circuit is completed through a wait station controller 288 to energize a wait station circuit 289. Energizing the wait circuit 289 causes a signal to be generated to a transfer area controller 291, the T–S memory 242, the T–F controller 228, the bin full memory 229, a storage bin empty memory 292, and the preliminary controller 223. The wait station circuit 289 remains energized when the trolley crane 37 actuates the limit switch 197. When the trolley crane 37 actuates the limit switch 196, the wait station circuit 289 generates a signal to the T–S memory 242 thereby completing a circuit to energize a trolley traverse slow circuit 293. Energizing the slow circuit 293 generates a signal to the slow down forward solenoid controller 285. A signal to the solenoid controller 285 completes a circuit to energize a slow down forward solenoid 294. The traverse slow circuit 293 also generates a signal to the T–S memory 242 to maintain the circuit 293 energized after the trolley 37 has passed the limit switch 196.

A signal from the traverse slow circuit 293 is also transmitted to the traversing timer controller 238 and a slow down reverse solenoid controller 296. As the trolley crane 37 actuates the limit switch 197, the signal generated by the wait station circuit 289 is transmitted to the transfer arm controller 291, the preliminary controller 223, the bin empty memory 292, the T–F circuit 228, and the bin full memory 229.

As the trolley crane 37 reaches its "TA" position, that is, when the pipe clamps 41 and 42 are over the transfer arm 22, it actuates the limit switch 198, shown in FIGURE 16 and in FIGURE 23, to complete a circuit through a controller 297 thereby energizing a transfer position circuit 298. Energizing the transfer position circuit 298 causes a signal to be generated to the T–F controller 228 to de-energize the T–F circuit 272. The transfer position circuit 298 also generates a signal to the H–L memory 231. A circuit is now completed in the H–L memory 231 and the H–L circuit 233 is energized.

As a result of energizing the H–L circuit 233, a signal is generated to the H–R controller 232, the hoist timing controller 239, the hoist slowing controller 241, the pipe clamp controller 243, the high speed solenoid controller 276, a hoist lower solenoid controller 299, a programming controller 301, and a bay full controller 302. Generating a signal to the hoist lowering solenoid controller 299 completes a circuit which energizes a hoist lowering solenoid 303.

Assuming an "out" trip, then the clamps 41 and 42 will be open and the hoist will be lowered to the transfer arm 22. When the hoist approaches the transfer arm 22, it closes a limit switch 304 (shown in FIGURE 11) thereby energizing a hoist limit circuit 306. Energizing the hoist limit circuit 306 through the limit switch 304 causes a signal to be generated to the H–L memory 231, the hoist slowing controller 241, and the pipe clamp controller 243 and the hoist changes from high speed operation to slow speed travel. Further travel of the hoist causes the limit switch 307 to be actuated thereby de-energizing the H–L circuit 233 which in turn causes the lowering solenoid 303 to be de-energized and the hoist stops.

A section of drill pipe in the transfer arm 22 which actuates the limit switch 307 also energizes the hoist limit circuit 306. Energizing the hoist limit circuit 306 through the limit switch 307 generates a signal to the H–L memory 231 and pipe clamp controller 243. A signal to the pipe clamp controller 243, when the limit switch 307 is closed and the trolley crane 37 at the transfer arm 22, completes a circuit to energize the pipe clamp circuit 248. Energizing the pipe clamp circuit 248 produces a signal to a clamp controller 308 thereby completing a circuit to connect a clamp solenoid 310 to the 110 volt A.C. supply and disconnecting a clamp solenoid 309. The clamps 41 and 42 now close on the section of drill pipe in the transfer arm 22 and when in a completely closed position actuate the limit switch 171, shown in FIGURE 14 and FIGURE 22. Actuating the limit switch 171 energizes the hoist limit circuit 306 and a signal is generated to the bin full memory 229, the H–L memory 231, the hoist slowing controller 241, the pipe clamp controller 243, and the preliminary controller 224.

A signal to the preliminary controller 224 from the hoist limit circuit 306 with the limit switch 171 closed and a signal at terminal 311 completes a circuit that energizes the preliminary starting circuit 256. Energizing the preliminary starting circuit 256 causes a signal to be transmitted to the preliminary controller 226, the T–R controller 227, the bin full memory 229, the H–L memory 231, the H–R controller 232, the pipe clamp controller 243, and the pipe cleaning controller 244. A signal from the preliminary starting circuit 256 to the hoist controller 232 completes a connection to energize the H–R circuit 236 which in turn generates a signal connected to the H–L memory 231, the hoist timing controller 239, the hoist slowing controller 241, the high speed solenoid controller 276, a hoist raise solenoid controller 312, and the bay full controller 302. The signal to the hoist raise solenoid controller 312 completes a circuit to connect a hoist raise solenoid 313 to the 110 volt A.C. supply.

As the trolley crane 37 approaches the storage bin area, the cam 200 actuates the limit switches 195–184 in that order. When the trolley crane 37 passes three bins before the preselected bin at which it is to stop, the limit switch at that position initiates a trolley slow down. When the hoist is positioned over the preselected bin, the limit switch at that location closes and the trolley stops. Assume that the trolley is to stop at the first bin from the transfer arm 22 to deposit the section of pipe held by the clamps 41 and 42. Under these assumed conditions, when the cam 200 actuates the limit switch 195, shown in FIGURE 16 and FIGURE 22, a connection is completed to energize a bay position circuit 314. The bay position circuit generates one of a number of different signals depending on the limit switch 181–195 actuated by the cam 200. Closing the switch 195 generates a signal to a bay area controller 316, and the T–S memory 242. Since the trolley crane 37 is to stop at the first bin from the transfer arm 22, a signal to the T–S memory 242 completes a circuit to energize the trolley slow circuit 293 which in turn generates a signal to the slow down controller 296. The signal to the slow down controller 296 completes a connection to energize a slow down reverse solenoid 317. The signal generated by the traverse slow circuit 293 connected to the T–S memory 242 maintains this circuit completed after the trolley 37 moves past the limit switch 195.

The trolley crane 37 continues to travel toward the storage bins at a slow speed until it reaches the selected storage bin; it then actuates the limit switch 192, shown in FIGURE 16 only, thereby energizing the bay position circuit 314. Energizing the bay position circuit 314 through the limit switch 192 generates a signal connected to a bay empty controller 318, the bay full controller 302, the bin empty memory 292, the bin full memory 229, and the H–L memory 231. A signal to the bin full memory 229 de-energizes the T–R circuit 267 which then generates a signal to the reverse solenoid controller 273 to de-energize the reverse solenoid 277. The T–R circuit 267 also generates a signal to the H–L memory 231 thereby completing a connection to energize the H–L circuit 233. Energizing the H–L circuit 233 causes a signal to be transmitted to the hoist lowering solenoid controller 299 and a circuit is completed to energize the lowering solenoid 303.

The signal produced by activating the H–L circuit 233 also completes a connection in the hoist timing controller 239 thereby energizing a hoist timer circuit 319. After a predetermined period of time, the hoist timing circuit 319 generates a signal to the high speed solenoid controller 276 which completes a connection to the high speed solenoid 283 from the 110 volt A.C. supply. Thus, the hoist begins to descend into the selected storage bin at a slow speed and after a predetermined period of time changes to high speed operation. The high speed operation continues until a limit switch 321, shown in FIGURE 19, mounted on the pipe sensor 158, shown in FIGURE 11, is actuated thereby completing a connection in the H–S controller 241 and energizing a hoist slowing (H–S) circuit 322. The signal generated by energizing the H–S circuit 322 breaks the connection to the hoist timing controller 239 thereby de-energizing the hoist timing circuit 319 and in turn the high speed solenoid 283. The H–S circuit 322 remains energized even after the limit switch 321 is deactivated and the hoist again descends at its slow speed operation.

The hoist continues to descend at a slow speed until properly positioned to discharge the section of drill pipe taken from the transfer arm 22. The correct position for the hoist to discharge the drill pipe is determined by actuating the limit switch 304 to complete a connection to the hoist limit circuit 306. As described previously, energizing the hoist limit circuit 306 through the limit switch 304 causes a signal to be generated to the H–L memory 231 thereby de-energizing the H–L circuit 233 which in turn generates a signal to de-energize the lowering solenoid 303. A signal generated by the hoist limit circuit 306 also de-energizes the H–S circuit 322 and the pipe clamping circuit 248. De-energizing the pipe clamp circuit 248 causes the clamp solenoid 310 to be de-energized and the clamp solenoid 309 to be energized; the clamps 41 and 42 now release the section of drill pipe.

Figure 22:
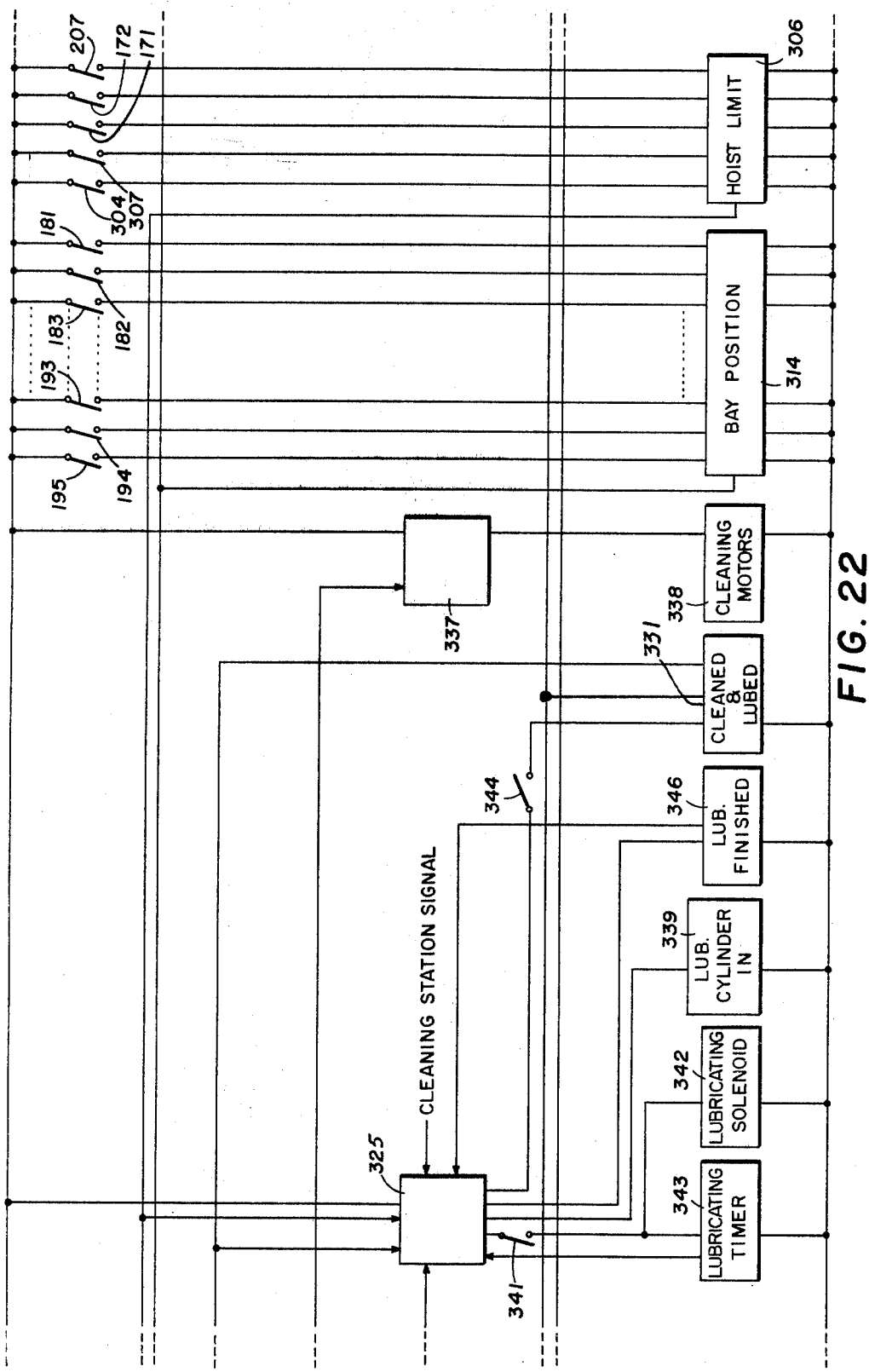

When the clamps 41 and 42 are fully opened, they actuate the limit switch 172, shown in FIGURES 14 and 22, to energize the hoist limit circuit 306. Eenergizing the hoist limit circuit 306 through the limit switch 172 generates a signal to the bin full memory 229, the empty bin memory 292, the preliminary controller 223, the preliminary controller 226, the H–L memory 231, and the pipe clamp controller 243. A signal to the preliminary controller 226 completes a connection to energize the preliminary starting circuit 257 which generates a signal to the preliminary controller 223, the T–R controller 227, the T–F controller 228, the H–L memory controller 231, and the H–R controller 232. A signal to the hoist rasing controller 232 energizes the hoist raising circuit 236 which in turn energizes the raise solenoid 313. Also energized is the hoist timer circuit 319 and after a predetermined period of time, the high speed solenoid 283 is connected to the 110 volt supply. Thus, as explained earlier when the hoist was descending, the hoist is raised at a slow speed for a given time interval and then changes to high speed operation. The high speed operation continues until the hoist truck 142 (referring to FIGURE 17) actuates the limit switch 206. Actuating the limit switch 206 energizes the hoist slowing circuit 322, as was described in the descending operation, thus de-energizing the high speed solenoid 285. The hoist continues to be raised at a slow speed until the hoist truck 142 actuates the limit switch 207, shown in FIGURES 17 and 22.

Actuating the limit switch 207 energizes the hoist limit circuit 306 which now generates a signal transmitted to the T–R controller 227, the T–F controller 228, the H–R controller 232, and a treating station controller 325. The signal to the trolley forward controller 228 energizes the T–F circuit 272 thereby energizing the forward solenoid 288 through the forward solenoid controller 287. In addition, a signal from the trolley forward circuit 272 also energizes the traverse timer 282 through the traverse timer controller 238. After a predetermined period of time, the traverse timer circuit 282 generates a signal to the high speed solenoid controller which energizes the high speed solenoid 285. Thus, as the trolley crane 37 starts forward from the storage bin area to the transfer arm area, it begins to move at a slow speed and after a predetermined period of time is transferred to a high speed mode of operation. The high speed mode of operation continues until the truck 106, shown in FIGURE 16, actuates the limit switch 196 as was explained previously. The slow down forward solenoid 294 is now energized by a signal generated in the traverse slow circuit 293. The same slow-high-slow speed operation takes place when the trolley crane 37 is traveling in the reverse direction.

To transfer sections of drill pipe from the storage bins to the transfer arm 22, the three-position switch 218 is placed in the "in" position. Basically, the mode of operation for transferring pipe to the transfer arm 22 is the same as transferring pipe to the storage bins; however, there are a few minor exceptions. For example, as the trolley crane 37, loaded with a section of drill pipe from the storage bins, reaches the pipe treating station 28, it actuates a limit switch 326 thereby completing a connection to a cleaning station circuit 327 through a station controller 328. Energizing the cleaning station circuit 327 causes a signal to be generated to the cleaning controller 244, the T–S memory 242, the T–F controller 228, the H–L memory 231, a pipe cleaning controller 329, a cleaned and lubed circuit 331. and a treating area controller 332. A signal to the cleaning controller 244 completes a connection to energize the start clean circuit 252 which generates a signal to energize the hoist lowering circuit 233 thereby connecting the lower solenoid 303 to the 110 volt supply. The same slow-high-slow mode of operation of the hoist takes place as was described previously.

When the hoist reaches the cleaning area, it actuates a limit switch to de-energe the lower solenoid 303 and the section of drill pipe is released from the clamps 41 and 42. A signal to the controller 329 energizes a pipe cleaning brush 333 and a rotation timer 334. Previously a pipe rotation circuit 336 was energized from the controller 244 and the drill pipe section begins to rotate. The pipe rotation circuit 336 also generates a signal to a cleaning motor controller 337 which completes a connection to energize the cleaning motors 338. After a predetermined period of time, the rotation timer 334 times out and a signal is generated to preset the controller 329. When the cleaning operation is completed, a limit switch 335 is actuated to energize a cleaning finished circuit 340 through the controller 329. The circuit 340 generates a signal to the hoist raising controller 232 and the treating station controller 325. The signal to the H–R controller 232 energizes the H–R circuit 236 which generates a signal to start the sequence of raising the hoist to lift the section of drill pipe, having been reclamped, from the cleaning area to the trolley crane traversing position. As the hoist truck 142 actuates the limit switch 207 it completes a circuit in the controller 325 to energize a lubrication cylinder solenoid 339. When the lubrication cylinder has been fully extended, it actuates a limit switch 341 to complete a connection to energize a lubrication solenoid 342 and a lubrication timer 343. After a predetermined period of time, the lubrication timer 343 times out and a signal is generated to energize a lubrication finished circuit 346. Energizing the lubrication finished circuit 346 generates a signal to de-energize the lubrication cylinder solenoid 339. When the lubrication cylinder has been returned to its home position, it actuates a limit switch 344 to energize the cleaned and lubed circuit 331. Energizing the cleaned and lubed circuit 331 starts the trolley crane 37 to continue its forward movement to the transfer arm 22.

As was explained previously, on approaching the transfer arm area, the trolley crane actuates the limit switch 196. The trolley will not proceed past the location of the limit switch 196 until the transfer arm 22 is in the proper receiving position. If the transfer arm is in the proper receiving position, a signal at terminal 347 will complete a circuit in the controller 291 to energize the transfer arm area circuit 348. When energized, the transfer arm circuit 348 generates a signal and the trolley proceeds to the transfer arm area.

Another difference between the "in" operation and the "out" operation occurs when the trolley approaches the storage bins to pick up another section of drill pipe. As stated previously, as the trolley crane 37 actuates the limit switch three bays prior to the one at which it is to stop; it then changes from high speed movement to low speed movement. The trolley speed memory 242 is programmed to select the limit switch to slow the trolley and the bin empty memory 292 contains a program for determining the limit switch which will stop the trolley crane 37 over the desired storage bin.

Figure 21:
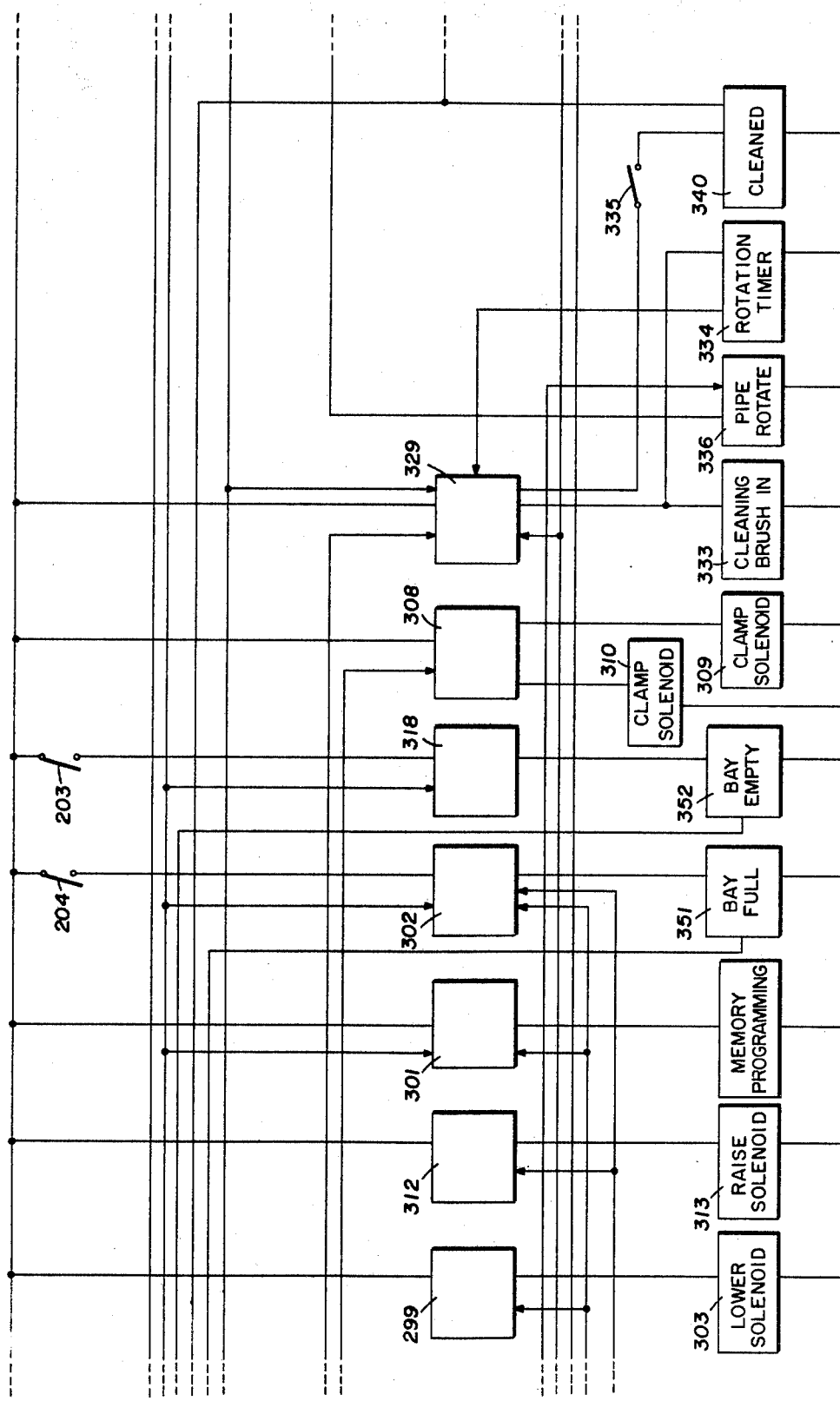

The programs of the memories 229, 242, and 292 are set by the hoist truck 142 as it actuates the limit switches 203 and 204, shown in FIGURES 17 and 21. When the hoist deposits a section of pipe into a bay needing only that section of pipe to be considered full, the limit switch 204 will be actuated thereby completing a circuit through the controller 302 to energize a bay full circuit 351. Energizing the bay full circuit 351 generates a signal to the bin full memory 229 and to the T–S memory 242. This signal presets the memory units used to control the operation of the trolley during its next "out" cycle. When the hoist truck 142 travels its full distance and actuates the limit switch 203, a circuit is completed through the controller 318 to energize a bay empty circuit 352. Energizing the bay empty circuit 352 generates a signal to the bin empty memory 292 and the T–S memory 242. This signal presets the memory units for use in a subsequent cycle during the "in" operation. Thus, when the hoist removes the last section of drill pipe from a bin, a signal is transmitted to the bay empty circuit 352 and the trolley stops at the next preceeding bin during a subsequent cycle. Thus, the bins are emptied in order starting from the outermost bin and proceeding to the bin closest the transfer arm. The memory units set by the bay full circuit 351 are employed during the "out" operation to instruct the appropriate memories that a given bin is full and to use the next bin during the subsequent cycle. The bin full memory 229 and the bin empty memory 292 also contain memory units to stop the trolley 37 at the limit switch 197 should all the bins be empty during the "in" operation or full during the "out" operation.

The control system of FIGURES 18–23 also includes auxiliary equipment to determine whether the pipe storage transfer apparatus 26 or 27 is to be used. The entire system is turned "on" and "off" by means of a double-pole two-position switch 353. This switch is mechanically coupled to a double-pole two-position switch in the alternate racker. The particular racker in use is determined by a two-pole three-position switch 354. In the position shown, drill pipe would be transferred to or from alternate rackers, that is, one section to one racker and the next to the other racker. The switch 354 completes a circuit through the controller 356 to energize an alternate racker circuit 357, provided the correct tower signal is applied to the terminal 358.

A signal generated by the circuit 357 is transmitted to a racker controller 359 and a circuit is completed to energize a racker #1 circuit 361. Energizing the racker #1 circuit 361 generates a signal to the controller 291 and the first racker is operational. After the first racker has completed one cycle, the tower signal at terminal 358 completes a circuit in the alternate selector controller 362 thereby energizing an alternate selector circuit 363. The circuit 363 generates a signal to the controller 356 to de-energize the circuit 357 and energize a circuit 364. The circuit 364 generates a signal to the second racker which then proceeds through one complete cycle.

If the switch 354 is in position 27, the circuit 361 will be energized continuously and only the racker 27 will be operational. On the other hand, if the switch 354 is placed in position 26, a companion circuit to that of circuit 361 associated with the racker 26 will be energized and that racker will be operational to the exclusion of racker 27.

Figure 24:
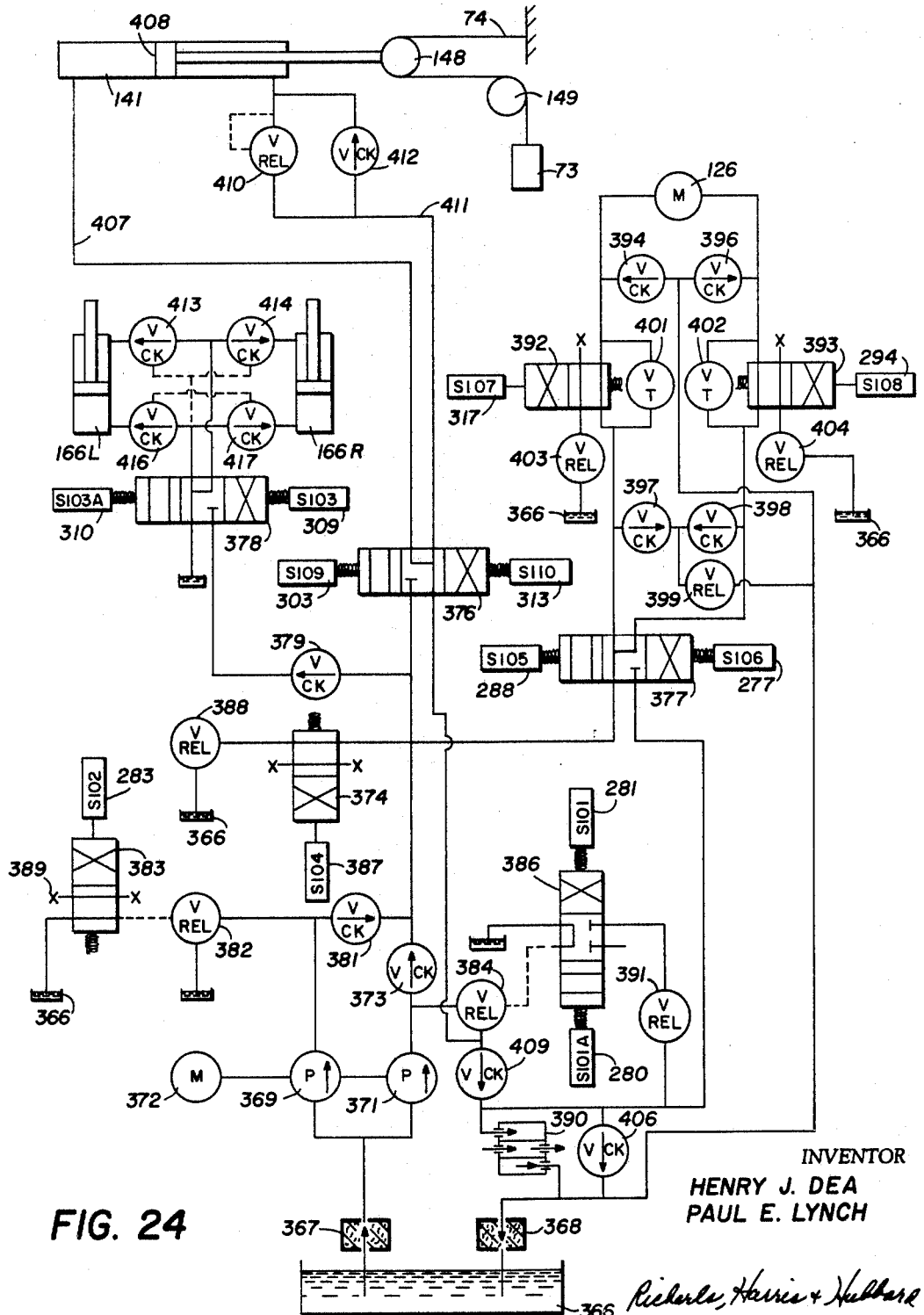
FIGURE 24 is a schematic of a hydraulic system for lowering the trolley crane and the up and down movement of the hoist.

Referring to FIGURE 24, there is shown the hydraulic control system for supplying control fluid to the trolley crane 37 and the hoist cylinder 141. The cylinder 141 is shown connected to the grab pipe 73 by means of the chain 74 engaging sprockets 148 and 149. Fluid is supplied to the system from a reservoir 366 through a screen 367. Two pumps, 369 and 371, driven by an electric motor 372, deliver fluid to the system at preset rates through the screen 367. Typically, the pump 369 delivers twenty-four gallons per minute and the pump 371 delivers 12.3 gallons per minute.

The pump 371 delivers fluid through a check valve 373 to a drill collar control valve 374, a three-position four-connection hoist control valve 376, a three-position four-connection trolley control valve 377, and a three-position four-connection pipe clamp control valve 378 through a check valve 379. Operating fluid from the pump 369 is supplied to the valves 374, 376, 377, and 378 through a check valve 381. Fluid from the pump 369 is also directed through a relief valve 382 to a high speed control valve 383. Fluid from the pump 371, in addition to flowing through the check valve 373, also flows to a relief valve 384 which is controlled by a three-position four-connection control valve 386.

All the valves in the system of FIGURE 24 are solenoid controlled; the two-position valves are spring offset and the three-position valves are spring centered. As shown, the solenoids are all de-energized and the valves in the spring controlled position. A solenoid 387 controls the drill collar control valve 374 when energized by completing a circuit in the drill collar controller 283 which in turn receives a signal from the manual operating circuit 221 if the switch 388 is in the position shown. This is the only system condition wherein the valve 374 is operative. The three-position hoist control valve 376 is actuated into a direct flow condition by the hoist lowering solenoid 303 and into a cross flow position by the hoist raise solenoid 313. Fluid is directed straight through the three-position trolley control valve 377 by energizing the trolley forward solenoid 288 and into a cross flow condition by energizing the trolley reverse solenoid 277. The three-position clamp control valve 378 is actuated into a straight through condition by the clamp closed solenoid 310 and into a cross flow condition by the clamp open solenoid 309. A straight through flow condition for the three-position slow speed valve 386 results from energizing the solenoid 280 and a cross flow condition by energizing the solenoid 281. The high speed valve 383 is actuated from a spring loaded straight through condition into a cross flow condition by means of the solenoid 283.

In the position shown, the drill collar valve 374 passes fluid from the pumps 369 and 371 to a pressure relief valve 388 which dumps the fluid into the reservoir 366 when the operating pressure exceeds a predetermined set point. With the solenoid 283 de-energized, the high speed valve 383 vents the relief valve 382 which directs fluid from the pump 369 to the reservoir 366. Thus, with the valve 383 in the position shown, the only operating fluid entering the system is provided by the pump 371 delivering 12.3 gallons per minute for slow speed operation. Energizing the solenoid 283 closes the vent line from the relief valve 382 at point 389 and the fluid delivered by the pump 369 passes through the check valve 381 and is added to the fluid supplied by the pump 371 to provide a total of 36.3 gallons per minute to the system for high speed operation.

Overall system pressure is maintained by the relief valve 384 as controlled by the valve 386. In the spring centered position of valve 386, a nominal system pressure is maintained since the relief valve 384 is vented thereby directing all the fluid delivered to the system by the pumps 369 and 371 to the reservoir 366. During normal operation, the solenoid 281 will be energized and the relief valve 384 is controlled by the setting of a relief valve 391. When extra high system pressure is required, the solenoid valve 280 will be energized thereby plugging the control port of the relief valve 384.

The fluid system for the trolley motor 126 includes the spring centered valve 377. With the solenoids 277 and 288 de-energized, a flow entering the valve 377 is equally divided into two paths, one which terminates at the reverse slow down valve 392 and the other terminates at the forward slow down valve 393. With the valves 392 and 393 in the position shown, fluid delivered by the pump 371 through the valve 377 is supplied to both the forward and reverse mechanisms of the fluid motor 126. As such, the motor is maintained in a locked position but ready to respond immediately to drive the trolley crane 37 in either the forward or reverse direction.

In addition to the reverse slow down valve 392 and the forward slow down valve 393, the fluid system for the motor 126 includes check valves 394 and 396 both connected to the reservoir 366 through a filter 368. These valves are used for replenishing the fluid to the motor 126 thereby preventing it from running dry. The fluid system for the motor 126 also includes check valves 397 and 398 coupled together to a relief valve 399 which dumps fluid into the reservoir 366 through the filter 368. A fixed restrictor 401 shunts the reverse flow valve 392 and the forward slow down valve 393 is shunted by a fixed restrictor 402.

The reverse slow down valve is spring offset into the position shown and actuated into a cross flow condition by means of the solenoid 317. With the valve 392 in a cross flow condition, fluid from the motor 126 is directed to a relief valve 403 which dumps the operating fluid into the reservoir 366 if it exceeds a predetermined pressure. Similarly, the forward slow down valve 393 is spring offset into the condition shown and actuated into a cross flow condition by means of the solenoid 294. When the valve 294 is in a cross flow condition, fluid from the motor 126 is directed to a relief valve 404 which also dumps the fluid into the reservoir 366 if it exceeds a predetermined pressure.

In operation, the trolley crane 37 moves forward, that is, toward the transfer arm 22, by energizing the solenoid 288 thereby causing the valve 377 to be actuated into the straight flow condition. Fluid supplied by the pump 371, or the pumps 371 and 369, is directed through the valves 377 and 392 to the motor 126, thereby causing the motor to rotate in a forward direction. Fluid discharged from the motor 126 passes through the valve 393, the valve 377, and through the heat exchanger 390 to the reservoir 366. If the solenoid 283 is de-energized, fluid from the pump 369 will be dumped into the reservoir 366 and only the pump 371 will be supplying fluid to the system. The trolley crane 37 travels in its slow speed mode of operation. Energizing the solenoid 283 causes both the pumps 369 and 371 to supply fluid to the system and the motor 126 operates at high speed and the crane moves in its high speed mode of operation. Energizing the solenoid 277, instead of the solenoid 288, positions the valve 377 in a cross flow condition and fluid is supplied the motor 126 through the valve 393. Under these conditions, the trolley 37 moves in a reverse direction. Again, the crane 37 travels in a slow speed mode if only the pump 371 is supplying fluid to the system and in a high speed mode when both pumps 369 and 371 are supplying the system.

As explained previously, as the trolley approaches the transfer arm area when traveling in the forward direction or the storage bin area when traveling in the reverse direction, it changes from a high speed mode of operation to a slow speed mode of operation. The change from high speed to low speed requires certain fluid system control changes to achieve a smooth transition between high and slow speed operation. In addition to de-energizing the solenoid 283, either the solenoid 294 or 317 is energized. When the trolley is moving in the forward direction, the solenoid 294 is energized and when moving in the reverse direction, the solenoid 317 is energized. Energizing these solenoids causes their respective valves to be actuated from a straight flow into a cross flow condition. For example, if the trolley is moving forward, the solenoid 294 is energized and the valve 393 is actuated into the cross flow condition. Fluid from the motor 126 is directed to the fixed restrictor 402, to the relief valve 404, and then to the reservoir 366 as explained previously. The restrictor 402 and the relief valve 404 create a back pressure on the motor 126 thereby providing proper deacceleration. Similarly, if the trolley is moving in the reverse direction, the solenoid 317 is energized thereby causing the valve 392 to be actuated into a cross flow condition and fluid from the motor 126 is directed through the restrictor 401 and the relief valve 403. To stop the trolley, the solenoids 277 and 288 are de-energized.

To lower the hoist, the solenoid 303 is energized thereby actuating the valve 376 into a straight through condition and fluid is supplied to the cylinder 141 through the line 407. Fluid discharged from the cylinder 141 by movement of the piston 408 flows through a counter balance valve 410, through the valve 376, through a check valve 409, and through the heat exchanger 390 check valve 406 to the reservoir 366. As explained previously, the hoist is powered initially at a slow speed with only the pump 371 supplying fluid to the system; after a predetermined period of time, the solenoid 283 is energized and the pumps 369 and 371 supply fluid to the cylinder 141 to lower the hoist at a high rate of speed. When the hoist approaches its lowest position, the solenoid 283 is de-energized and the hoist is again lowered in a slow speed mode. Special precautions are not required when slowing the hoist as was required with regards to the fluid motor 126. To raise the hoist, the solenoid 313 is energized causing the valve 376 to assume a cross flow condition and fluid is supplied to the cylinder 141 through a line 411 and a check valve 412. Fluid discharged from the cylinder 141, as a result of movement of the cylinder 408, is directed through line 407 to the reservoir 366 through the check valve 409 and the heat exchanger 390.

The pipe clamps 41 and 42 are opened and closed by directing fluid through the three-position valve 378. Energizing the solenoid 310 actuates the valve 378 to a straight flow position and fluid is supplied the cylinders 166L and 166R through respective check valves 413 and 414. Only the pump 371 is used to supply fluid for operation of the clamps 41 and 42. To open the clamps 41 and 42, the solenoid 309 is energized and the valve 378 is actuated to a cross flow condition. Fluid from the pump 371 is directed to cylinder 166L through a check valve 416 and to the cylinder 166R through a check valve 417. Again, only the pump 371 is used to supply fluid during this operation.

GENERAL DESCRIPTION OPERATION

In operation, referring specifically to FIGURE 25 and generally to the other figures where necessary, after the derrick 10 has been elevated to the vertical position, the racker trailers are parked next to the pipe treating stations. Fluid pressure is supplied to the crane elevator cylinders, such as cylinder 56 on racker 27 and cylinder 118 for the racker 26, and the crane rails 419 and 421 are elevated and unfolded into their operating position. Since drill pipe sections can be stored in the storage bins during transportation of the racker, the system is ready to deliver pipe to the transfer arm 22 as soon as the crane rail 421 is in its operating position.

Assume that the trolley 37 is between the storage bins and the cleaning station 28. The switch 218 is positioned for either "in" or "out" operation, the 213 is set in the automatic position, and the push button 219 actuated. After a predetermined period of time, the starting circuit 258 generates a signal to latch itself and the preliminary starting circuits 256 and 257 energized. The switch 219 is then released. The system will not start in the automatic mode of operation until after this time delay has elapsed which is designed to prevent immediate reversal from a trip "in" to a trip "out" operation. Previous to this, the switch 354 was placed in either the "26" position, the "27" position, or the alternate position. For purposes of this description, it will be assumed that the switch 354 has been placed in the "27" position and the racker 27 is operational.

For delivering drill pipe from the storage bins to the transfer arms 22, the switch 218 is placed in the "in" position. The preliminary starting circuit 254 and the "in" circuit 264 are energized and in turn energize the trolley reverse circuit 267 through the memory 229 and the controller 227. Energizing the circuit 267 connects the solenoids 277 and 281 to the 110 volt line and fluid is supplied to the motor 126 through the valve 377. The trolley crane 37 travels in the reverse direction toward the storage bins 44 at a slow speed. After a time interval, the solenoid 283 is energized thereby directing the fluid discharge from the pump 369 through the check valve 381 and the trolley now operates in a high speed mode. The high speed operation continues until one of the limit switches 184–195 is actuated three bays prior to the bay at which the trolley has been programmed to stop. Actuating one of the limit switches energizes the traverse slow circuit 293 to de-energize the traverse timer circuit 282 and the solenoid 283. The solenoid 317 is also energized at this time to direct the flow of fluid from the motor 126 through the restrictor 401 and the relief valve 403. The storage bins are emptied in progressive order starting with the farthest bin from the transfer arm and emptying the bin closest to the transfer arm last.

When the trolley crane 37 has stopped at its self selected bay, the lower circuit 233 is energized and a signal generated to energize the solenoid 303 to direct fluid from the pump 371 to the cylinder 141. The hoist starts descending into the storage bin at a slow speed. After a time interval, the solenoid 283 is energized to combine the output of the pump 369 with that of the pump 371 and the hoist now descends in its high speed mode. The hoist continues to be lowered at a fast speed until the limit switch 304 is actuated thereby energizing the hoist slowing circuit 322. Energizing the H–S circuit 322 causes a de-energizing signal to be transmitted to the hoist timing circuit 319 and the solenoid 283 is de-energized. The hoist continues to descend at its slow speed until the limit switch 307 is actuated. Actuating the limit switch 307 disconnects the solenoid 303 and valve 376 shuts off fluid flow to the cylinder 141 thereby stopping movement of the hoist.

Closing the limit switch 307 also de-energizes the H–L circuit 233 and energizes the clamp circuit 248 to de-energize the solenoid 309 and energize the solenoid 310 to direct fluid to the cylinders 166L and 166R through the check valves 413 and 414 and the clamps 41 and 42 close. When the clamps 41 and 42 are fully closed, they actuate the limit switch 171, one mounted on each of the clamps, and the preliminary circuit 256 is energized. The signal generated by energizing the circuit 256 de-energizes the circuit 254 by de-energizing the circuit 257. In addition, the trolley reverse circuit 267 is de-energized and the raise circuit 236 energized. The solenoid 313 is connected to the 110 volt line through the circuit 236 and the hoist starts its ascent out of the bins at a slow speed. Using the same circuitry as employed in the lowering operation, the hoist is switched to high speed movement when the solenoid 283 is energized and returns to a slow speed operation when the limit switch 206 is actuated. Actuating the limit switch 207 de-energizes the solenoid 313 and the hoist stops in its raised position.

Actuating the limit switch 207 also energizes the trolley forward circuit 272 which in turn energizes the forward solenoid 288 of valve 377. The trolley starts forward at a slow speed by means of the same circuitry that was used in controlling the trolley in its reverse operation. The forward moving trolley 37 changes to high speed travel when the solenoid 283 is energized to supply more fluid to the motor 126 by means of the pump 369. The trolley 37 returns to the slow speed operation when the limit switch 326 is actuated thereby de-energizing the solenoid 283 and energizing the solenoid 294 to restrict the fluid flow from the motor 126 by means of the restrictor 402 and the relief valve 404. Solenoids 288 and 294 are then de-energized and the trolley 37 stops in the cleaning area of the pipe treating station 28.

With the trolley 37 in the pipe cleaning area of the treating station 28, the start cleaning circuit 252 is energized and in turn the hoist lowering circuit 233 which energizes the solenoid 303 to operate the valve 376. The hoist is lowered into the cleaning station in the slow speed mode and stops when in the pipe cleaning position. The pipe rotating circuit 336 is energized along with the cleaning brush solenoid 333 to extend the cleaning brush. After a time interval determined by the rotation timer circuit 33, the solenoid 333 is de-energized and the brush retracts actuating a limit switch 335. Actuating the limit switch 335 energizes the pipe cleaned circuit 340 which in turn energizes, the hoist raise circuit 236. A signal generated by the circuit 236 connects the solenoid 313 to the 110 volt supply and the hoist raises at a slow speed until the hoist truck 142 actuates the limit switch 207. Actuating the limit switch 207 at this time energizes the pipe lubricating solenoid 339 to insert a pipe lubricator into the drill pipe. When the lubricator has been fully inserted, it actuates the limit switch 341 thereby energizing the lubrication solenoid 342, to inject a measured quantity of grease into the pipe threads, and the lubrication timer 343. After a time interval, the timer 343 times out and the lubrication solenoid 339 is de-energized thereby retracting the lubricator. When the lubricator is fully retracted, it actuates the limit switch 344 to energize the cleaned and lubed circuit 331.

The section of drill pipe transferred from the storage bin area has now been fully treated and energizing the cleaned and lubed circuit 331 connects the solenoid 288 to the 110 volt supply through the trolley forward circuit 272 and fluid is directed to the fluid motor 126 through the valve 377. As described previously, the trolley crane 37 starts out at a slow speed and then increases to a high speed mode of travel. It continues to travel at the high speed until the trolley truck 106 actuates the limit switch 196. Actuating the limit switch 196 reduces the travel speed of the crane which then moves at the slow speed until actuating the limit switch 197. If the transfer arm 22 is not in the proper pipe receiving position, actuating the limit switch 197 causes the solenoid 288 to be de-energized and the trolley stops at the waiting station.

If the transfer arm 22 is in the position shown in FIGURE 25, actuating the limit switch 197 energizes the transfer arm circuit 265 and the trolley 37 goes forward at a slow speed until it actuates the limit switch 198. By a series of interconnections, not shown, energizing the transfer arm circuit 265 prevents movement of the transfer arm 22 from its horizontal position.

Actuating the limit switch 198 with the transfer arm 22 in the position shown connects the solenoid 303 to the 110 volt supply and the hoist lowers the drill pipe section into the clamps 422 of the transfer arm 22. This is the position of the hoist shown in FIGURE 25. The hoist operation is substantially the same as that described previously in the removal of a pipe section from the storage bins. Lowering the hoist into the transfer arm area continues until the limit switch 304 is actuated. The clamp 41 is now opened by fluid passing through the valve 378 and when fully opened, actuates the limit switch 172 thereby de-energizing the preliminary starting circuit 256 and energizing the preliminary starting circuit 257. Energizing the starting circuit 257 again activates the hoisting circuitry and the hoist moves to its fully raised position as explained previously.

Actuating the limit switch 207 again activates the trolley reverse circuit 267 and the trolley moves in the reverse direction towards the rack in a slow speed mode until actuating the limit switch 197. Actuating the limit switch 197 at this time de-energizes the preliminary starting circuit 257 and re-energizes the preliminary starting circuit 254. However, as mentioned previously, if all the storage bins are empty, the bin memory 292 prevents the circuit 267 from being energized and the trolley stops at the limit switch 196. If pipe is available in the storage bins, the trolley crane 37 proceeds without stopping to the bin area.

Operation of a racker in "out" condition is similar in many respects to an "in" operation, merely using a different sequence. Initially, the preliminary starting circuit 254 and the "out" circuit 263 are energized along with the trolley forward controller 228 to energize the trolley forward circuit 272. As a result of energizing the trolley forward circuit 272, the solenoids 281 and 288 are connected to the 110 volt supply and fluid is transmitted to the motor 126. The trolley 37 starts forward, that is toward the transfer arm 22, at a slow speed and after a time interval determined by the traverse timer 282, the solenoid 283 is energized, fluid from the pump 369 is combined with fluid from the pump 371 and the trolley picks up speed and moves forward in its high speed mode of operation. The trolley 37 continues to move toward the transfer arm 22 at high speed until it actuates the limit switch 196 thereby energizing the traverse slow circuit 293. The valve 389 again dumps fluid from the pump 369 to the reservoir 366 as the signal from the circuit 293 disconnects the solenoid 283 from the 110 volt supply. As explained, the solenoid 294 is energized at this time to direct fluid from the motor 126 through the restrictor 402 and the relief valve 404. The motor 126 now operates at a slow speed. Should the transfer arm 22 not be in the proper position, the trolley crane 37 stops when the limit switch 197 is actuated. Under these conditions, actuating the limit switch 197 de-energizes the solenoid 288 to shut off fluid to the motor 126. On the other hand, if the transfer arm 22 is in the position shown in FIGURE 25, the trolley crane 37 continues to move at a slow rate of speed past the limit switch 197.

Actuating the limit switch 197, with the transfer arm 22 in the correct position, causes the transfer arm circuit 265 to be energized thereby generating a signal to lock the transfer arm in the horizontal position. The trolley continues to move forward at a slow speed, starting circuit 257 having been energized and starting circuit 254 de-energized by actuation of limit switch 197, until it actuates the limit switch 198. Actuating the limit switch 198 completes a circuit to energize the hoist raising circuit 236 thereby completing a connection to energize the solenoid 303. As explained with regard to the "in" operation, the hoist starts down at a slow speed by passing fluid from the pump 371 to the cylinder 141 through the valve 376. After a predetermined interval of time, the solenoid 283 is energized and the fluid discharged from the pump 369 is directed through the check valve 381 to the cylinder 141 and the hoist now descends at a high speed. It continues to descend at the high speed until the limit switch 304 on the pipe sensor 158 is actuated to energize the hoist slow down circuit 322 and in turn de-energizes the hoist timer circuit 319 and the solenoid 283. The hoist continues to descend with the pipe hooks 41 and 42 in their open position until the section of drill pipe in the transfer arm 22 actuates the limit switch 307. Actuating the limit switch 307 causes the hoist lowering circuit 233 to be de-energized which in turn de-energizes the solenoid 303.

Actuating the limit switch 307 also energizes the clamp circuit 248 to generate a signal that connects the clamp solenoid 310 to the 110 volt supply. Fluid is directed to the cylinders 166L and 166R and the clamps 41 and 42 close on the section of drill pipe in the transfer arm 22. Closing the clamps 41 and 42 actuates the limit switch 171 thereby energizing the preliminary starting circuit 256 and de-energizing the preliminary starting circuit 257.

Energizing the preliminary starting circuit 256 activates the hoist raising circuit 236 and the solenoid 313 is connected to the 110 volt supply. Using substantially the same circuit as was used when the hoist descended into the transfer arm, the hoist is now raised first at a slow speed then, after a predetermined interval of time, at a high speed and again returning to slow speed operation when the trolley 142 actuates the limit switch 206. The hoist stops when the limit switch 207 is actuated thereby disconnecting the solenoid 313 from the 110 volt supply. The hoist lowering and raising operation is similar to that described previously with regards to the "in" operation.

The trolley crane 37 now moves in the reverse direction toward the storage bins as a result of actuating the limit switch 207 which energizes the trolley reverse circuit 267. A connection is completed in the circuit 267 to energize the solenoid 277; the trolley moves forward at a slow speed as long as it is in the transfer arm area, that is, the area between the limit switches 198 and 196. If all the storage bins are full, the trolley crane 37 moves in a reverse direction until it actuates the limit switch 197. Under these conditions, the limit switch 197 disconnects the solenoid 277 from the 110 volt supply and the trolley stops. However, if space is available in the storage bins, the trolley proceeds past the limit switch 197 without stopping and as it passes the limit switch 196, the transfer arm circuit 265 is de-energized which causes the traverse timer 282 to be energized. After the traverse timer 282 times out, a signal is generated that energizes the solenoid 283 and the trolley transverses the pipe treating area 28 at high speed.

The trolley continues its high speed travel in a reverse direction until actuating one of the limit switches 184–195 three storage bins ahead of the preselected bin where the trolley has been programmed to stop. The T–S memory 42 contains the program that establishes the limit switch that energizes the traverse slow down circuit 293. This memory unit is programmed by operation of the trolley crane and hoist during the preceding cycle. If during the preceding cycle a section of drill pipe filled a particular storage bin, a signal is generated to the memory 242 and the trolley will be indexed one bin to the left during the subsequent cycle.

Actuating a limit switch three bays ahead of the programed bay at which the trolley is to stop activates the traverse slow down circuit 293 thereby de-energizing the traverse timer 282 and in turn the solenoid 283 to slow down the crane's reverse speed. As explained, whenever the trolley is slowed from its high speed operation, one of the valves 392 or 393 must be actuated to provide deceleration of the motor 126. At this time, the solenoid 317 is energized to actuate the valve 392. The trolley stops at the proper bay when the limit switch associated with that bay is actuated thereby de-energizing the trolley reverse circuit 267. The bin selection information is contained in the program of the storage bin memory 229. Memory 229 is programmed at the same time and in the same manner as the memory 242.

After the trolley 37 has stopped at its self-selected storage bin, the hoist is lowered starting at a slow speed, changing to a high speed descent, and finally returning to a slow speed descent when the limit switch 304 is actuated.

Actuating a limit switch 304 completes a circuit to the solenoid 309 and fluid is directed to the cylinders 166L and 166R to open the clamps 41 and 42. When the clamps 41 and 42 are fully opened, the limit switch 172 is actuated and the preliminary starting circuit 254 is energized which in turn de-energizes the preliminary starting circuit 256. The hoist begins a slow speed ascent, then transfers to high speed and again returns to its slow speed; it is stopped when the hoist truck 142 actuates the limit switch 207. The trolley 37 now moves toward the pipe treating station 28 going through the slow speed, high speed, slow speed sequence until it actuates the limit switch 197. When the limit switch 197 is actuated, the preliminary starting circuit 254 is de-energized and the preliminary starting circuit 257 re-energized. The trolley crane 37 has now completed one cycle and is ready to proceed again to the transfer arm 22. Note, that in the trip "out" operation, the cleaning sequence is omitted.

During both the trip "in" and trip "out" operations, the entire sequence is controlled by one of the preliminary starting circuits 254, 256, or 257. Referring to FIGURE 26, there is shown a bar chart indicating the energized state of these three circuits at each point of a cycle. Consider a trip "in" operation, if the trolley crane 37 is located somewhere between the limit switch 197 and the limit switch 179, the preliminary starting circuit 254 will be energized. After a section of drill pipe has been retrieved from the storage bins, the preliminary starting circuit 256 is energized during the forward travel of the trolley through the pipe treating station 28 and to the transfer arm 22. Next, after a section of drill pipe has been deposited into the transfer arm 22, the preliminary starting circuit 256 is de-energized and the preliminary starting circuit 257 energized. Thus, during a trip "in" operation, the starting circuit 256 will be energized when the hoist is carrying a section of drill pipe and either the preliminary starting circuit 254 or 257 energized when the clamps 41 and 42 are empty.

During a trip "out" operation, if the trolley 37 is again located somewhere between the limit switches 179 and 197, the preliminary starting circuit 254 will be energized and the clamps 41 and 42 empty. After the trolley passes the limit switch 197, the preliminary starting circuit 254 is de-energized and the preliminary starting circuit 257 energized. Next, after the hoist has been lowered into the transfer arm 22 to retrieve a section of drill pipe and been raised to its traveling position, the starting circuit 257 is de-energized and the starting circuit 256 energized. Again, the circuit 256 is energized when a section of drill pipe is being transported by the trolley 37 and either the circuit 254 or 257 energized when the clamps are empty.

While only one embodiment of the invention, together with modifications thereof, has been described in detail herein and shown in the accompanying drawings, it will be evident that various further modifications are possible in the arrangement and construction of its components without departing from the scope of the invention.

What is claimed is:

1. In a pipe racking and transfer assembly having an elongated platform with a first wall affixed thereto proximate one end and a second fronting wall affixed thereto proximate the other end, pipe separators carried by the facing sides of said confronting walls forming upstanding, parallel pipe storage bins, a pipe transfer crane movable transversely of said storage bins, a vertically movable pipe hoisting means carried by and depending from the crane for inserting pipe into and removing pipe from said storage bins, an improved means for supporting said pipe transfer crane comprising:

a vertically extendable and retractable crane rail assembly carried at each end of said platform for supporting said crane during its transverse movement over said storage bins, and mean for vertically extending and retracting said crane rail assembly.

2. In a pipe racking and transfer assembly as set forth in claim 1 wherein said vertically extendable and retractable crane rail assembly includes:
   a first frame affixed to said platform and upstanding therefrom to a height substantially equal to the height of said storage bins, and
   a second frame positioned proximate to said first frame and adapted to be vertically extended and retracted relative to said first frame by said vertically extending and retracting means, said second frame retracting to a height substantially equal to the height of said pipe storage bins.

3. In a pipe racking and transfer assembly as set forth in claim 2 wherein said rail assembly additionally includes a third frame positioned proximate said first and second frames and adapted to be extended above said first and second frames by said vertically extending and retracting means when said second frame is extended relative to said first frame, and retracted relative to said first and second frames by said extending and retracting means when said second frame is retracted relative to said first frame.

4. In a pipe racking and transfer assembly as set forth in claim 3 wherein said first frame includes a track for guiding said second frame to its extended and retracted positions, and said second frame includes a similar track for guiding said third frame when extended and retracted relative to said first and second frames.

5. In a pipe racking and transfer assembly as set forth in claim 3 wherein said third frame includes a crane rail for guiding said pipe transfer crane as it traverses the area of said storage bins.

6. In a pipe racking and transfer assembly as set forth in claim 5 including first and second crane rail extensions pivotally mounted to opposite sides of said third frame to rotate between a storage position and a second position wherein they form a substantially straight continuous rail with the crane rail section of said third frame thereby extending the travel of said pipe crane past the ends of the confronting wall sections mounted to said platform.

7. In a pipe racking and transfer assembly as set forth in claim 6 wherein said means for vertically extending and retracting said frame assembly includes a hydraulic cylinder affixed to said platform and the upper portion of said second frame to cause said second frame to be extended and retracted relative to said first frame.

8. In a pipe racking and transfer assembly as set forth in claim 7 wherein said second frame includes two rotating sprockets mounted at opposite ends of the upper portion of said frame, and a pair of flexible chains individually engaging said sprockets and fastened at one end to said first frame and at the other end to said third frame to cause said third frame to be extended and retracted relative to said first and second frames when said second frame is extended and retracted relative to said first frame.

9. In a portable pipe racking and transfer assembly having an elongated platform comprising:
   a first wall affixed to said platform proximate one end and a second confronting wall affixed to said platform proximate the other end,
   pipe separators carried by the facing sides of said confronting walls to form upstanding parallel pipe storage bins for storing drill pipe sections during transportation of said assembly and when set up and operating at a given location,
   a vertically extendable and retractable frame assembly carried at each end of said platform and including a crane rail at the upper portion thereof,
   a pipe transfer crane supported in said crane rail movable transversely of said storage bins, and
   a vertically movable pipe hoist carried by and depending from said crane for inserting pipe into and removing pipe from said storage bins.

10. In a portable pipe racking and transfer assembly as set forth in claim 9 including drive means associated with said crane to control the transverse movement of said crane relative to said storage bins.

11. In a portable pipe racking and transfer assembly as set forth in claim 10 including drive means connected to said pipe hoist for movement thereof when inserting pipe into and removing pipe from said storage bins.

12. In a portable pipe racking and transfer assembly as set forth in claim 11 including means for vertically extending and retracting said frame assembly.

13. In a portable pipe racking and transfer assembly as set forth in claim 12 wherein said means for vertically extending and retracting said frame assembly includes a hydraulic cylinder attached to said platform and to said frame assembly.

14. In a portable pipe racking and transfer assembly as set forth in claim 11 including control means for energizing said drive means to position said crane over a preselected storage bin.

15. In a portable pipe racking and transfer assembly as set forth in claim 14 including control means actuated by the movement of said crane to energize said hoist drive means.

16. In a portable pipe racking and transfer assembly having an elongated platform comprising:
   a first wall affixed to said platform proximate one end thereof,
   a second confronting wall affixed to said platform proximate the other end,
   pipe separators carried by the facing sides of said confronting walls forming upstanding, parallel pipe storage bins for storing pipe during the transportation of said platform and during the operation of said assembly,
   a first frame affixed to said platform at each end thereof and extending therefrom to a height substantially equal to the height of said storage bins,
   a second frame positioned proximate to said first frame and adapted to be vertically extendable and retractable relative to said first frame, said second frame retracting to a height substantially equal to the height of said pipe storage bins,
   a third frame positioned proximate said first and second frames and adapted to be extended above said first and second frames when said second frame is extended relative to said first frame, and retracted relative to said first and second frames when said second frame is retracted relative to said first frame, said third frame including a crane rail at the upper end,
   a pipe transfer crane supported by said crane rail and movable transversely of said storage bins,
   a vertically movable pipe hoist carried by and depending from said crane for inserting pipe into and removing pipe from said storage bins, and
   control means connected to said crane and said hoist for controlling the movement thereof relative to said storage bins.

17. In a portable pipe racking and transfer assembly as set forth in claim 16 including means for vertically extending and retracting said second frame relative to said first frame and said third frame relative to said first and second frames.

18. In a portable pipe racking and transfer assembly as set forth in claim 17 including first and second crane rail extensions pivotally mounted to opposite sides of said third frame and rotatable from a storage position to a second position wherein they form a substantially straight and continuous rail with said third frame rail thereby extending the travel of said crane beyond the ends of said confronting walls.

19. In a portable pipe racking and transfer assembly as set forth in claim 18 wherein said means for vertically extending and retracting said frames includes a hydraulic cylinder affixed to said platform and to the upper portion of said second frame,
- a pair of sprockets rotatably mounted at opposite ends of the upper portion of said second frame, and
- a pair of flexible chains individually engaging said sprockets and connected at one end to said first frame and at the other end to said second frame.

References Cited

UNITED STATES PATENTS 3,236,400   2/1966   Viurturro et al. _____ 214—75

GERALD M. FORLENZA, Primary Examiner

R. B. JOHNSON, Assistant Examiner

U.S. Cl. X.R.

214—2.5, 75